United States Patent [19]

Shimada et al.

[11] Patent Number: 5,581,560

[45] Date of Patent: Dec. 3, 1996

[54] COMMUNICATION APPARATUS AND METHOD FOR SIMULTANEOUS COMMUNICATION OF AUDIO AND DATA SIGNALS WITH IMPROVED AUDIO CONTROL

[75] Inventors: Kazutoshi Shimada, Yokosuka; Yoshio Yamashita, Tokyo; Yasutomo Suzuki, Yokohama; Nobuyuki Niwa, Tokyo, all of Japan

[73] Assignee: Canon Kabushiki Kaisha, Tokyo, Japan

[21] Appl. No.: 294,491

[22] Filed: Aug. 23, 1994

[30] Foreign Application Priority Data

Aug. 27, 1993 [JP] Japan ................................. 5-212991
Aug. 27, 1993 [JP] Japan ................................. 5-213005

[51] Int. Cl.⁶ ........................................................ H04J 3/12
[52] U.S. Cl. ........................... 370/527; 370/493; 370/498; 379/98
[58] Field of Search ........................ 370/110.1, 110.4, 370/112, 110.3, 110.2, 109, 118, 100.1, 103, 24, 29, 30, 31, 32, 45, 41, 42, 50, 53, 57, 56, 58.1, 58.2, 58.3, 60, 60.1, 61, 94.1, 94.2, 69.1, 68.1, 120, 121, 125, 76, 77, 84, 11, 92, 93; 375/222, 362, 376, 223, 272; 348/14, 423, 465, 17, 438, 485, 24, 481; 379/93, 94, 95, 96, 97, 98, 100, 351; 395/735, 734, 733; 381/18, 19; 380/14, 20, 36

[56] References Cited

U.S. PATENT DOCUMENTS

| | | | |
|---|---|---|---|
| 4,392,023 | 7/1983 | Sears | 379/98 |
| 4,431,872 | 2/1984 | Edwards et al. | 374/351 |
| 4,715,059 | 12/1987 | Cooper-Hart et al. | 379/98 |
| 4,962,521 | 10/1990 | Komatsu et al. | 379/96 |
| 5,036,513 | 7/1991 | Greenblatt | 370/125 |

FOREIGN PATENT DOCUMENTS

| | | |
|---|---|---|
| 0097314 | 6/1983 | European Pat. Off. . |
| 0338654 | 1/1989 | European Pat. Off. . |
| 92/06550 | 4/1992 | WIPO . |

Primary Examiner—Douglas W. Olms
Assistant Examiner—Dang Ton
Attorney, Agent, or Firm—Fitzpatrick, Cella, Harper & Scinto

[57] ABSTRACT

In order to automatically renew data using a modem which can simultaneously transmit/receive audio and data signal, there is disclosed an apparatus having a modem which can simultaneously transmit/receive audio and data signal (4 in FIG. 2), a discrimination circuit (flow chart in FIG. 5B) for discriminating if a communication partner is a specific partner, and a control CPU (flow charts in FIGS. 4A and 4B) for controlling the modem to perform a predetermined data communication together with an audio call on the basis of the discrimination result of the discrimination circuit.

36 Claims, 25 Drawing Sheets

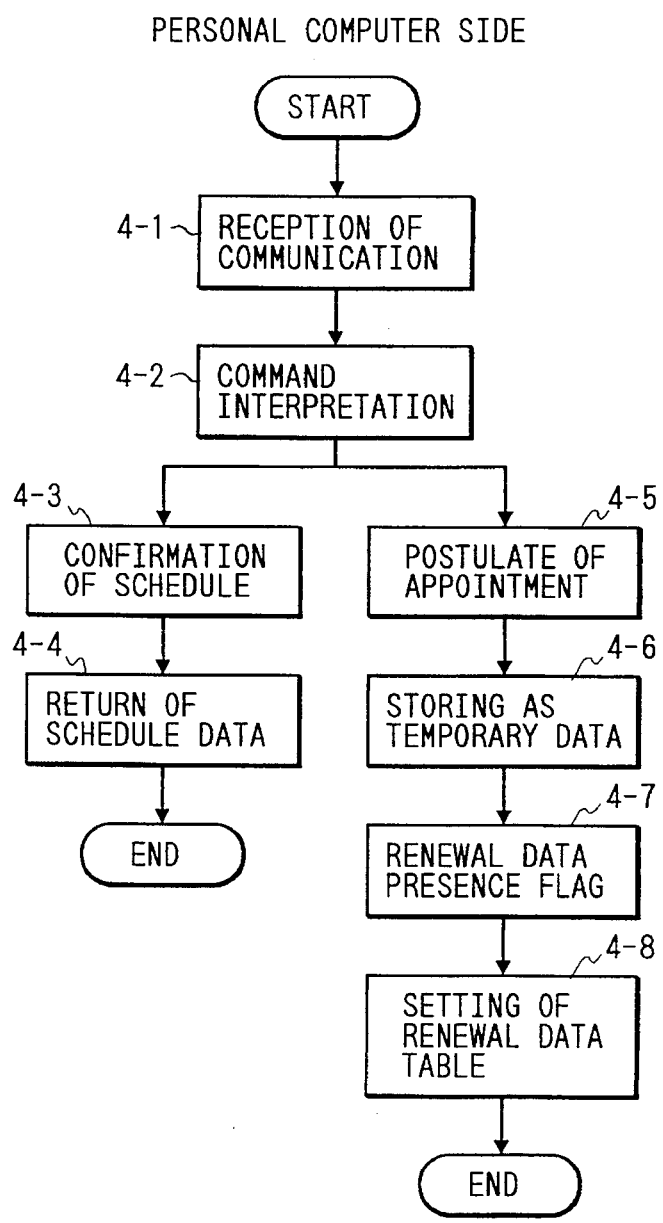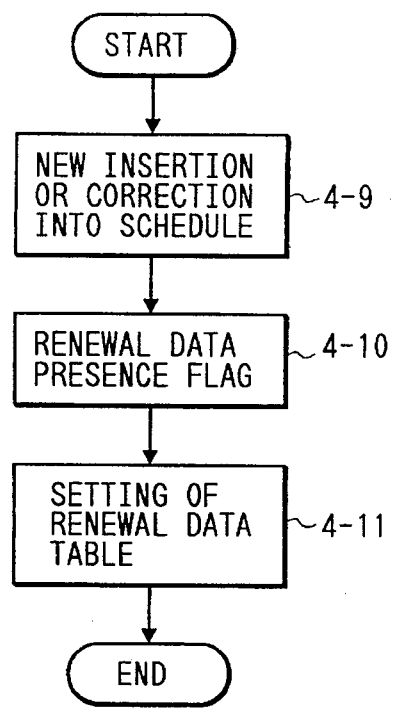

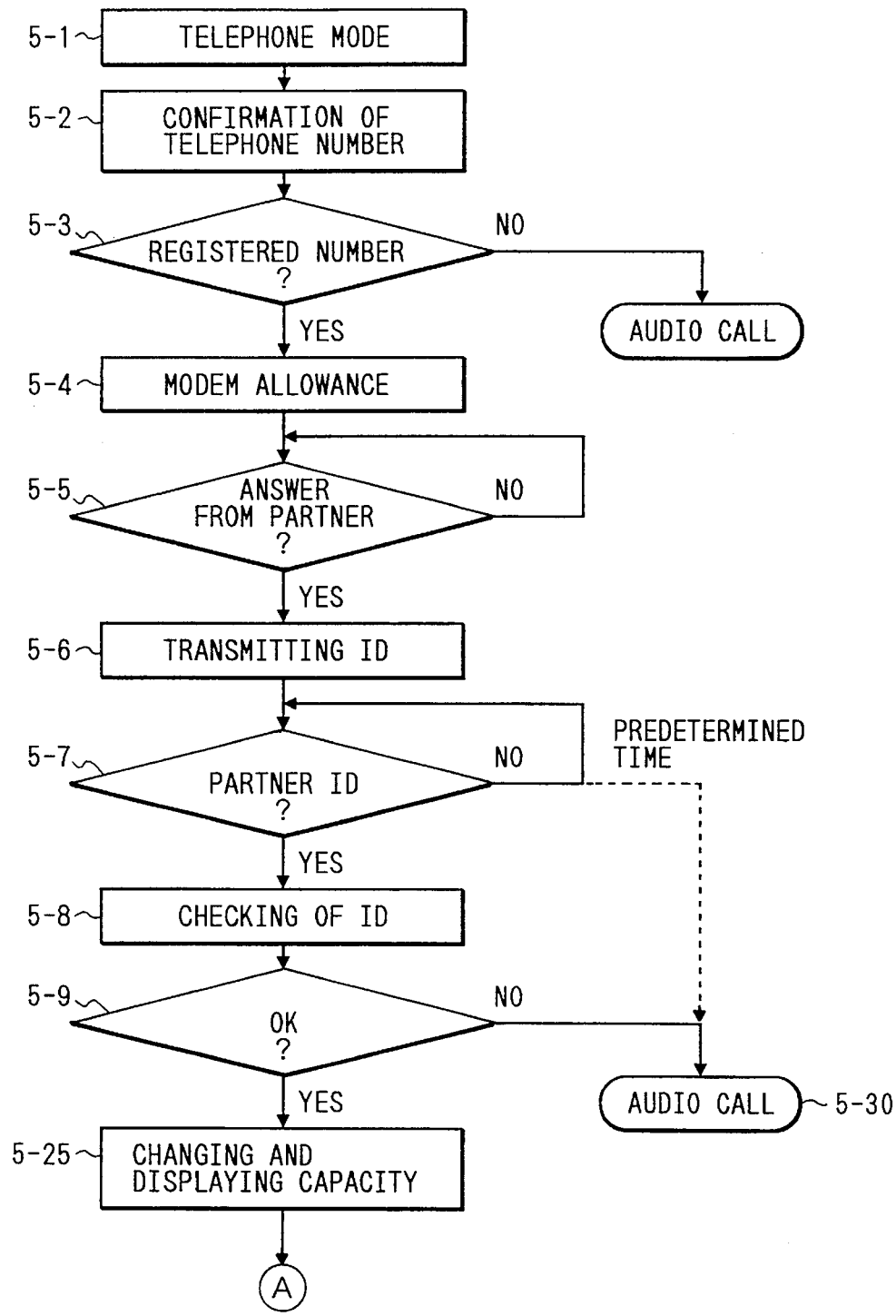

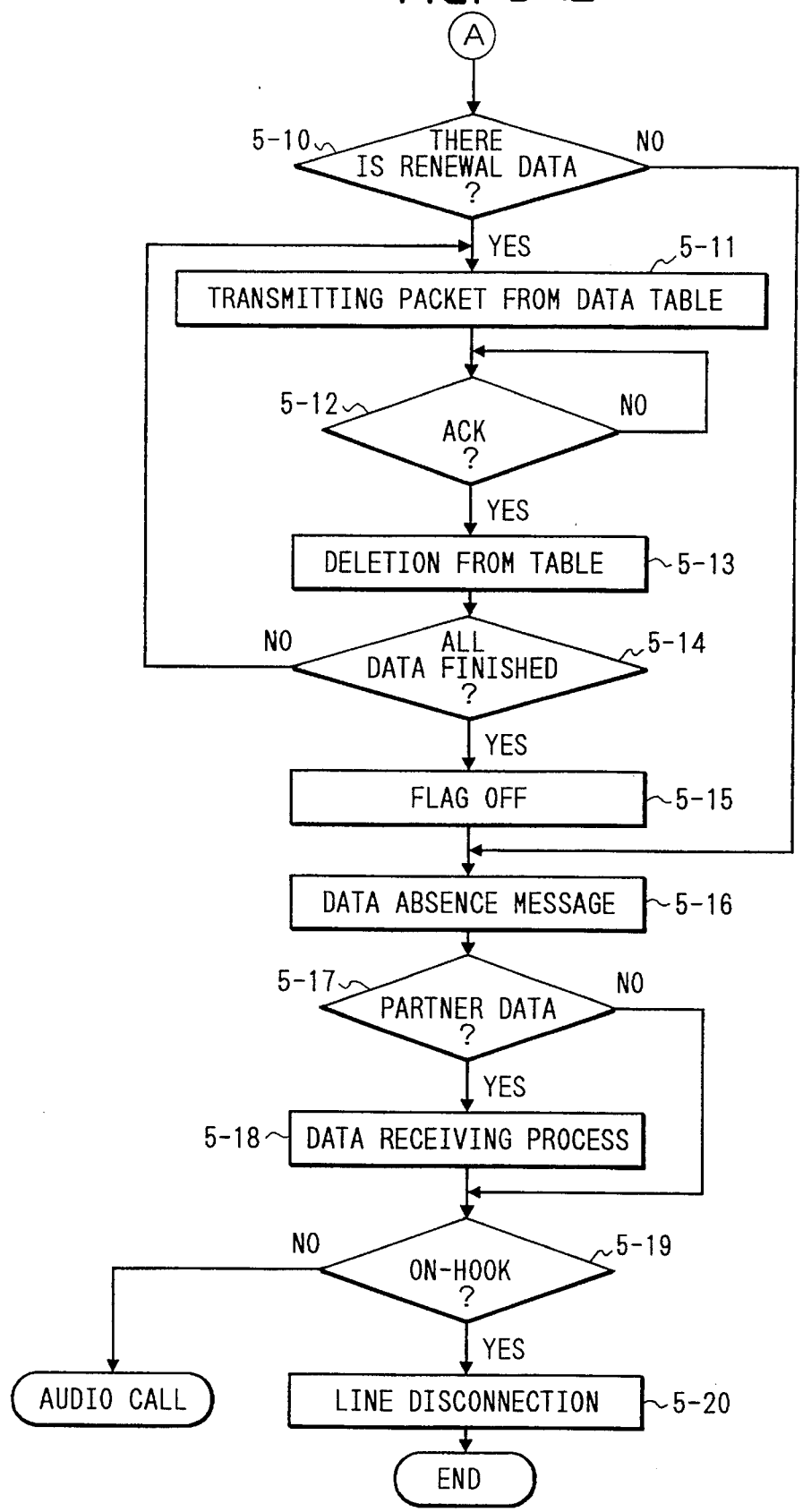
FIG. 5A2

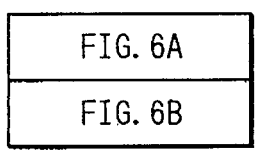
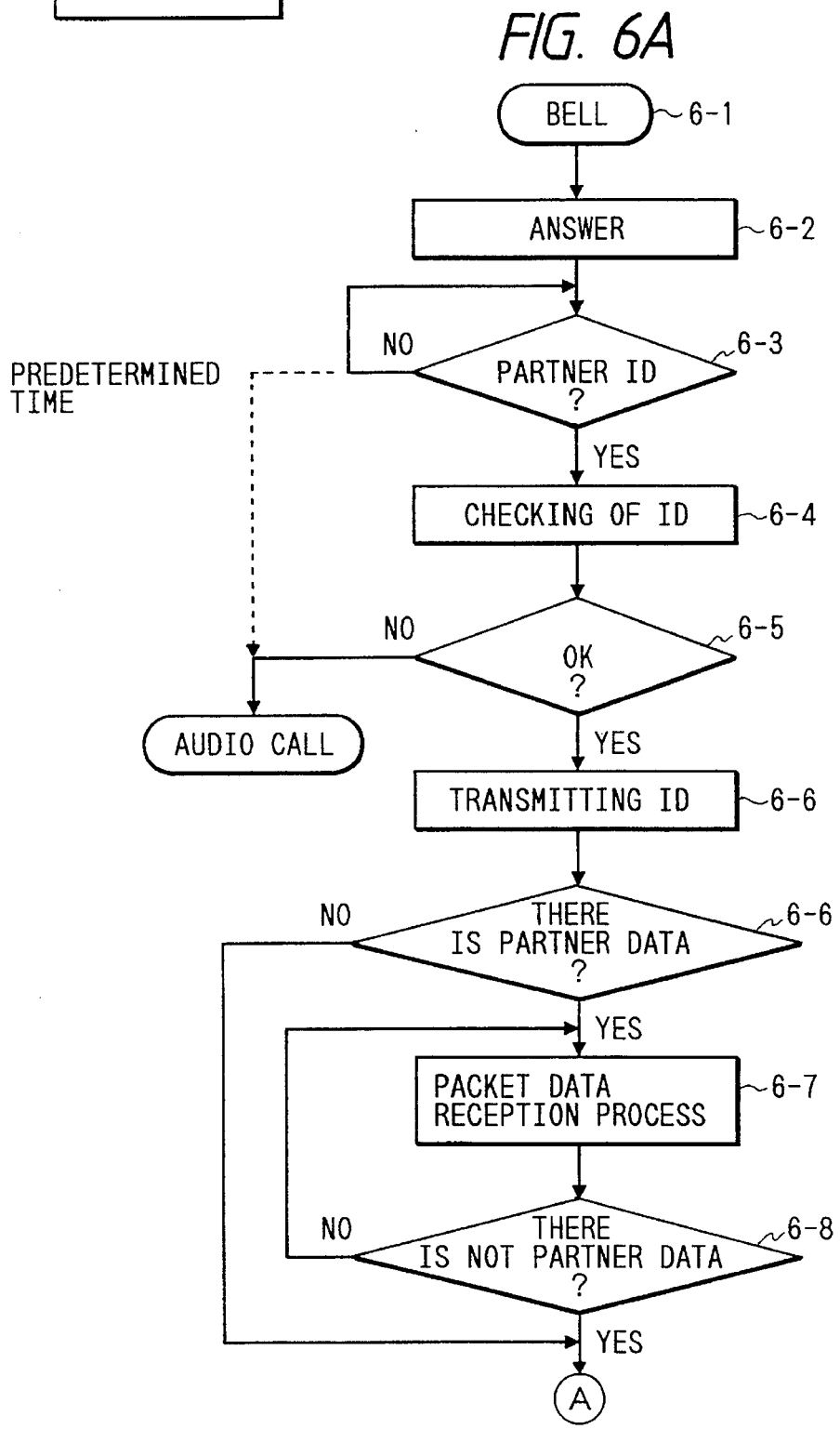

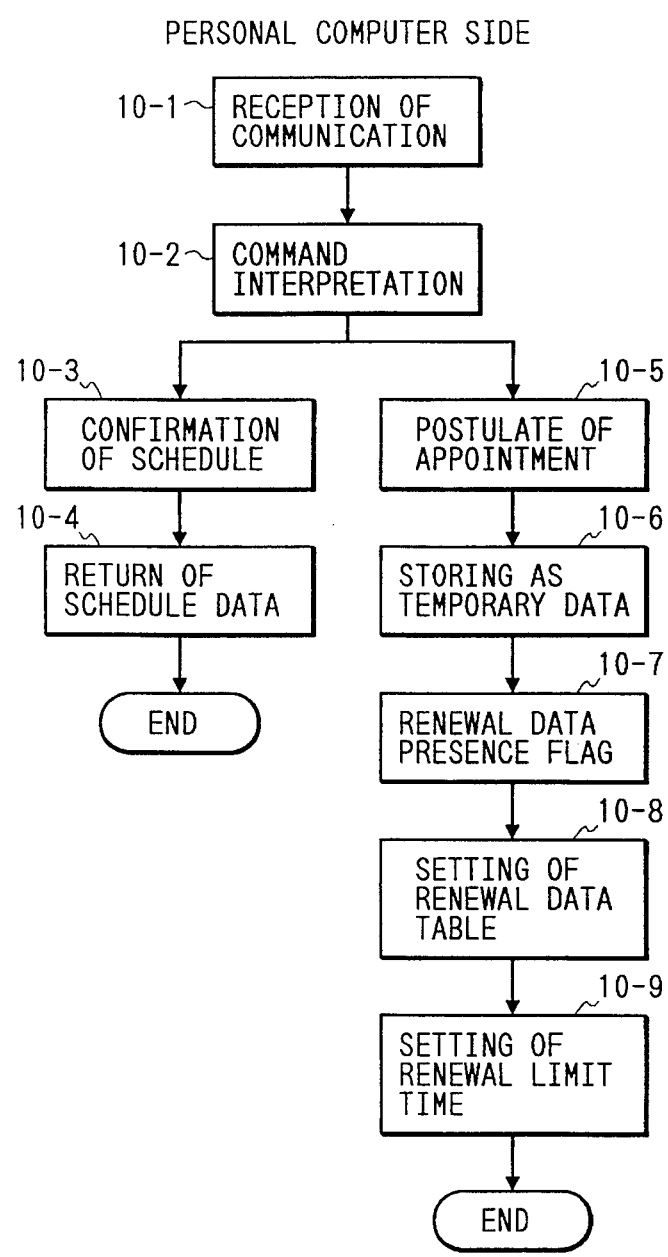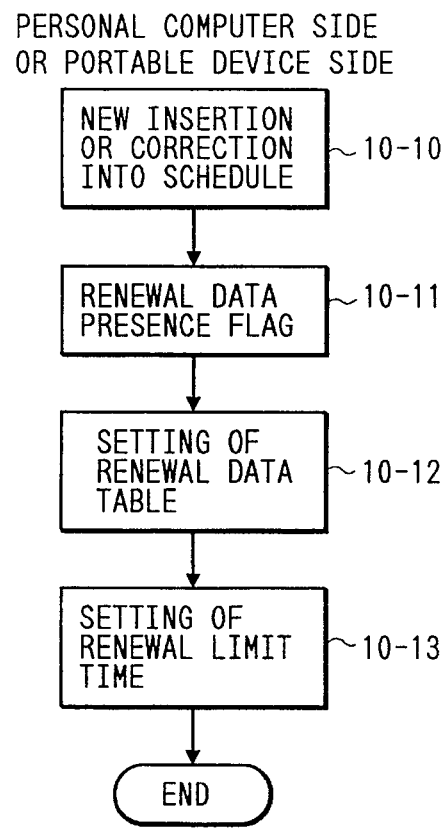
FIG. 10A / FIG. 10B

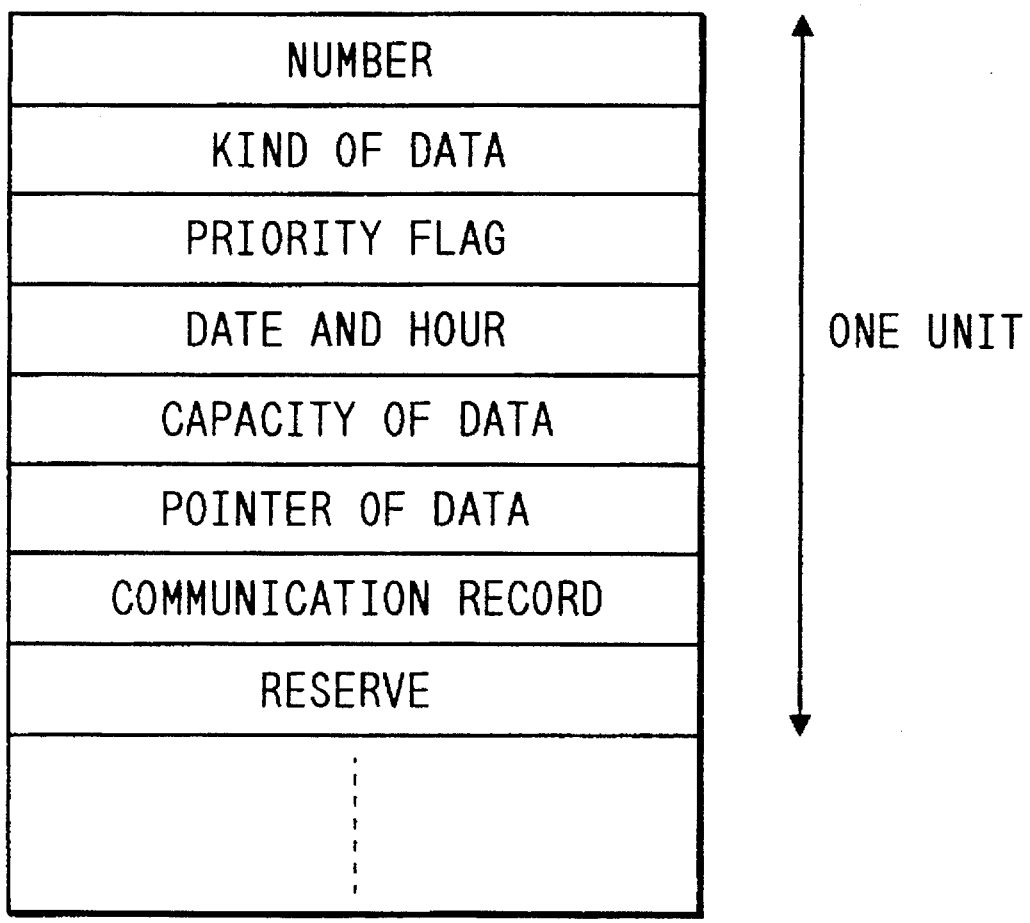

COMMUNICATION APPARATUS AND METHOD FOR SIMULTANEOUS COMMUNICATION OF AUDIO AND DATA SIGNALS WITH IMPROVED AUDIO CONTROL

BACKGROUND OF THE INVENTION

1. Field of the Invention

The present invention relates to a communication method and apparatus for performing communications using data transmission means which can simultaneously transmit an audio signal and data.

2. Related Background Art

In recent years, owing to the downsizing of computers such as notebook type personal computers and with the advent of electronic stock control and slip process systems using, e.g., POS systems, information in an office can be accessed using a notebook type personal computer or a special-purpose handy terminal via a communication line during sales activity (out) time away from the office. As a result, information acquisition and stock confirmation at a customer site can be easily realized, and a quick response to a customer's need can be attained.

An actual sales person connects a notebook type personal computer or handy terminal to a modem (a PCMCIA card or unit) and a portable telephone, and makes a telephone call to a host computer or a personal computer in his or her office so as to exchange data. Furthermore, recently, electronic devices such as pen computers incorporating a portable telephone function are commercially available.

These electronic devices can be used for managing personal schedules and address books in addition to original jobs such as sales activities. Since information is electrically processed, when personal information such as a schedule of a particular sales person directly heard from him or her is stored in a notebook type personal computer or a portable electronic device, a third party can access this information to confirm his or her schedule and/or to make an appointment on behalf of this sales person. Furthermore, facsimile (FAX) data which has been conventionally output onto a paper sheet can be read on a display screen or can be easily transmitted using a FAX server or a FAX system using a personal computer. For this reason, in addition to a one-way access in which a sales person at a remote location performs confirmation of a received order or a stock, it is often required to send data from an office to the location of the person so as to renew his or hew personal schedule or to send FAX data to this person.

As a background for such requirements, an environment for personal use of electronic devices has been established since high-performance, compact, and low-cost devices have become commercially available, and the area of spread of information has increased due to a widened service area and lower cost of wireless telephones.

A conventional modem (a data or FAX modem) modulates data to transmit digital data onto an analog telephone line for transmitting an audio signal. For this reason, when data is transmitted, a normal speech communication is disabled. However, a modem which can simultaneously transmit audio and data signals (data and FAX) by a time-division or double-carrier method when two stations use identical modems has been recently developed.

However, not to mention a case wherein a modem which can send only data is used, even when a modem which can simultaneously transmit data and audio signals is used, a user cannot know the state of data transmission while performing a speech communication. Therefore, operability is poor. When a speech communication and a data communication are simultaneously performed for different purposes, the progresses of the two communications often contradict with each other.

In addition, not to mention a case wherein a modem which can send only data is used, even when a modem which can simultaneously transmit data and audio signals is used, as described above, a user must perform an operation for sending data while making a speech communication, resulting in poor operability. Furthermore, even when data is renewed in a portable device or a host computer in an office, data is not renewed unless a user makes a telephone call to renew the data.

SUMMARY OF THE INVENTION

The present invention has been made in consideration of the above situation, and has as its object to provide a communication method and apparatus with good operability.

It is another object of the present invention to provide a communication method and apparatus which can prevent contradiction between the progress states of audio and data communications even when the audio and data communications are simultaneously performed.

In order to achieve the above object, according to a preferred aspect of the present invention, there is disclosed an apparatus comprising data transmission means capable of simultaneously transmitting/receiving audio and data signals, and information means for informing a transmission/reception state of data by the data transmission means to a user who makes a speech communication using the data transmission means, wherein the information means informs the transmission/reception state of data by the data transmission means to the user.

It is still another object of the present invention to provide an apparatus which has a novel function using data transmission means which can substantially simultaneously transmit audio and data signals.

Other objects and features of the present invention will become apparent from the following description of the embodiments taken in conjunction with the accompanying drawings.

BRIEF DESCRIPTION OF THE DRAWINGS

FIGS. 4A to 4C are flow charts and a table associated with setting of renewal data according to the embodiment of the present invention;

FIG. 5A is comprised of FIG. 5A1 and FIG. 5A2 showing flow charts at the transmitting side according to the embodiment of the present invention.

FIGS. 10A to 10D are flow charts showing a limit time setting routine and its interruption routine;

FIG. 16 is a data table;

DETAILED DESCRIPTION OF THE PREFERRED EMBODIMENTS

Figure 1:
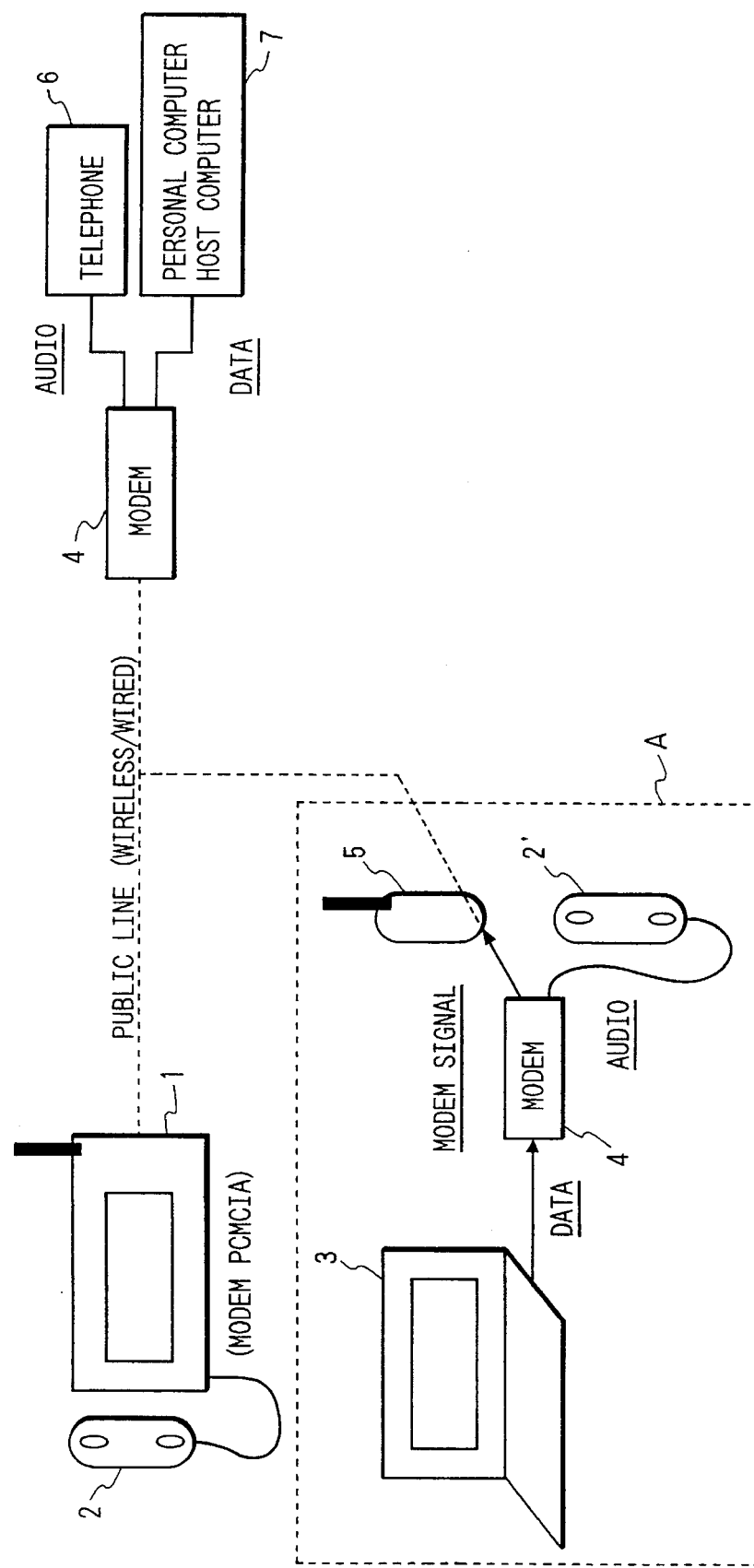
FIG. 1 is a block diagram showing the entire arrangement according to an embodiment of the present invention.

FIG. 1 is a schematic diagram showing a data transmission/reception system via a public line using a communication apparatus according to an embodiment of the present invention. A portable electronic device 1 (a pen computer in FIG. 1) has a wireless telephone function. The telephone function can be used by inputting a number using a soft ten-key pad displayed on the screen or designating a number in an address book displayed on the screen, and an audio signal is exchanged with an operator via a hand set 2. The electronic device may be an existing notebook type personal computer 3 which does not incorporate a wireless telephone function. In this case, a modem 4 is connected to a PCMCIA interface of the electronic device 3. A wireless telephone 5 is a normal one, and is connected to the modem 4 to perform wireless data transmission. The modem 4 as data transmission means of this embodiment can simultaneously transmit audio and data signals.

Therefore, in the apparatus of this embodiment, an audio signal is also transmitted via the modem 4. More specifically, audio information is converted into digital data, the digital data is modulated by the modem 4, and the modulated data is output onto a line. A receiving operation is performed in an order opposite to the above-mentioned transmitting operation.

These two types of portable electronic devices are used at a remote location. On the other hand, a personal computer or host computer 7 is a machine which is equipped at a fixed place in, e.g., an office and can manage order slips, stock state, and personal schedules. The computer 7 is also connected to a public line via the modem 4. A telephone 6 is a normal one used in ordinary jobs. The public line may be either a wireless line or a wired line. In this embodiment, a case has been exemplified wherein the portable electronic device is used in a remote location. However, the present invention can be applied to, e.g., communications between a desktop machine in a branch office and a host computer in a head office.

Figure 2:
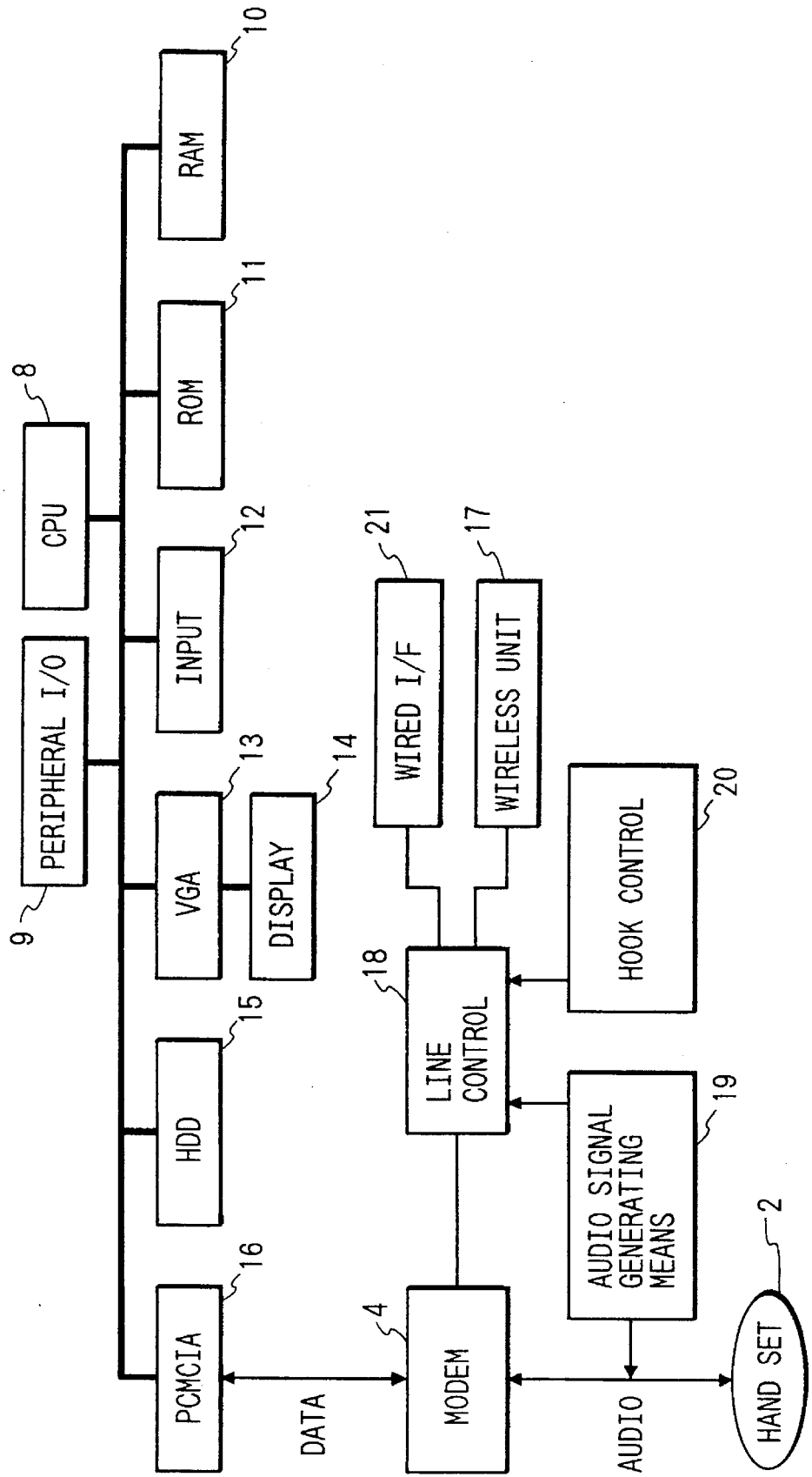
FIG. 2 is an internal block diagram of an electronic device according to the embodiment of the present invention.

FIG. 2 is a schematic block diagram showing the arrangement of the portable electronic device 1 or a block A shown in FIG. 1. The arrangements of the device 1 and the block A are substantially the same, except for the types of CPU devices.

Referring to FIG. 2, the electronic device 1 or the block A comprises a CPU 8 for controlling the electronic device 1 or the block A, a peripheral I/O 9 connected to CPU peripheral devices (e.g., a memory controller), a RAM 10, a ROM 11, and an input device 12. If the electronic device 1 comprises a pen computer, a digitizer is used as a standard input device; if the electronic device 1 comprises a notebook type personal computer, a keyboard is used as a standard input device. The device 1 or the block A also comprises a display controller (VGA) 13, and a display 14 which may be either a liquid crystal display or a CRT. The device 1 or the block A further comprises a hard disk 15 for storing a large amount of programs and user data, and an interface (called a PCMCIA) 16 for an IC card, which interface is attached to a compact electronic device as standard equipment, and to which the modem 4 is connected. Of course, in place of such a detachable card, the modem 4 may be incorporated in the device. A wireless unit 17 transmits/receives radio waves in accordance with the specifications of a wireless telephone. A line control unit 18 performs line control such as an operation for informing a line connection state to a wireless network via the wireless unit in response to an operation for making a telephone call, i.e., an operation for setting an off-hook state by picking up a hand set. A hook control unit 20 transmits a line connection request or a disconnection request from the CPU to the line control unit 18. In practice, the hand set is set in an off-hook state after the CPU discriminates the overall state. Thus, as will be described later, even when the user sets the hand set in an off-hook state, data transmission is continued. An audio signal generating means 19 generates a pseudo dial tone upon disconnection which indicates the end of an audio call to a communication partner in place of an exchange when one of communication partners who communicate with each other sets the hand set in an on-hook state, and generates a DTMF signal. An I/F 21 such as RJ11 is used for connecting a wired line.

Figure 3:
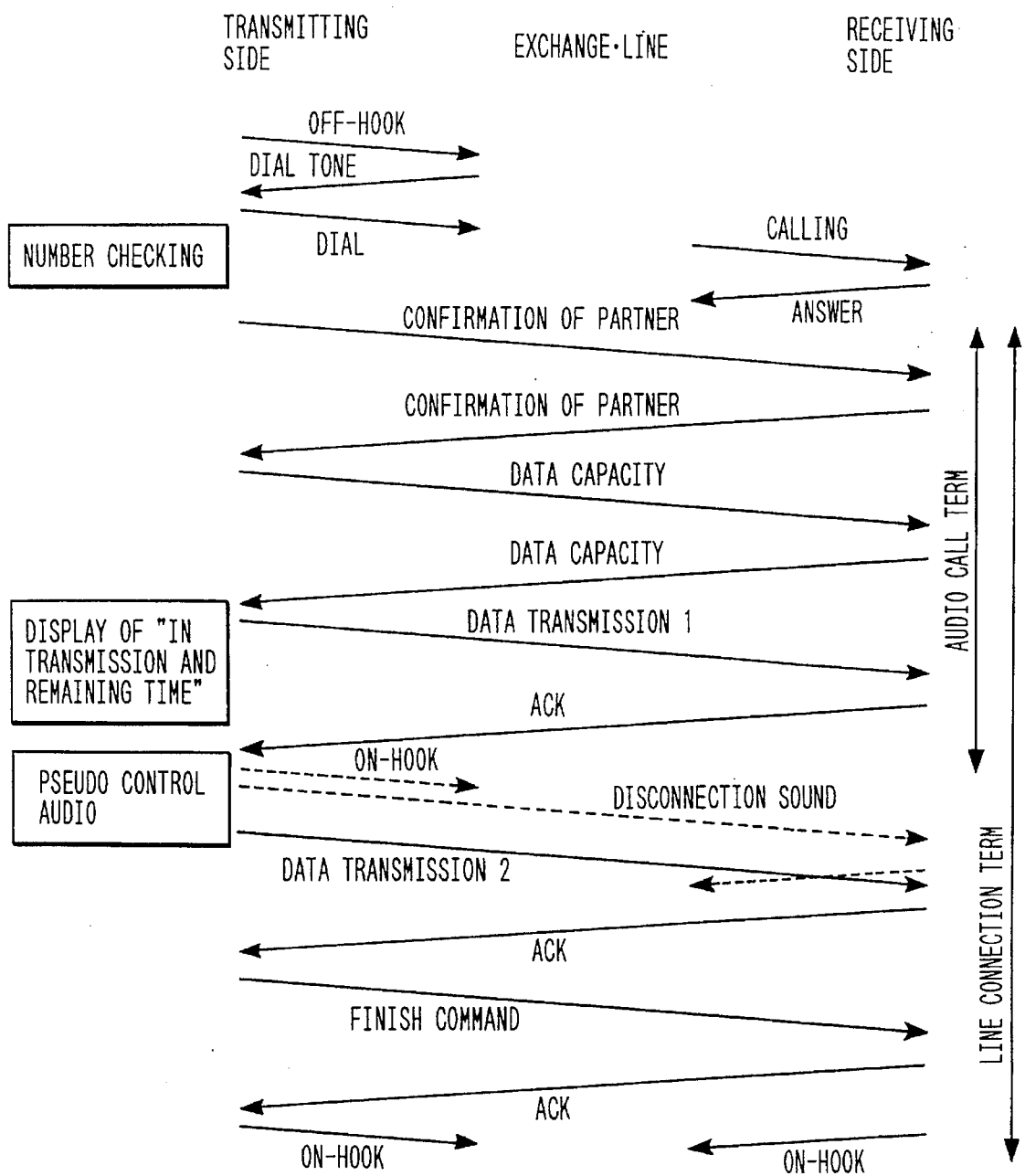
FIG. 3 is a communication diagram of the embodiment of the present invention.

FIG. 3 is a diagram showing actual data and audio call sequences in a system disclosed in this embodiment. The transmitting and receiving sides can be either a remote location or an office. In this example, only the transmitting side has data to be renewed.

A user at the transmitting side sets an "off-hook" state by picking up the hand set 2 or 2' or using a hook icon (not shown) on the screen. With this operation, a line between the transmitting side and an exchange is opened, and the exchange sends back a dial tone indicating reception of this operation. When the dial tone is confirmed, the electronic device itself automatically dials in accordance with a predetermined software program or the user manually dials. At this time, the CPU 8 in the system monitors the dialing operation, and checks if the dial number coincides with a registered one. The registered dial number is a number of a terminal as a partner having a modem which can simultaneously send audio and data signals.

If the coincidence between the two numbers is confirmed, a partner device comprises a modem which can simultaneously send audio and data signals, and devices at two ends of a line may have data to be sent to the other. Therefore, when the partner answers, the two devices exchange data communication packets with each other using the function of the modem which can simultaneously send audio and data signals, and a channel for transmitting data, i.e., a background channel to confirm their IDs (identification information), regardless of the contents of an audio call. When one or both devices have data to be sent, the data is sent as packets in units of data. The receiving side performs an error check operation each time it receives a packet, and returns an ACK signal if no error is detected.

When a data communication is started, the start of the data communication is informed to a user. The information means may display a message "in data transmission" or may use a simple means such as an LED (not shown). Data is transmitted from the transmitting side first, and when data transmission has been finished and the receiving side has data to be transmitted, data is transmitted from the receiving side (not shown in FIG. 3).

These data exchange operations progress regardless of an audio call, and the progress state of the data exchange operations does not influence an audio call or action of the user. For this reason, as soon as a user finishes an audio call, he or she sets the hand set in the on-hook state or operates the hook icon on the screen to hang up the telephone.

However, if the data transmission is being executed, the line control unit 18 keeps the line connected. At the same time, in order to cause one audio call partner to recognize that the other partner hangs up the telephone, the audio signal generating means 19 generates a disconnection tone. At this time, the data is kept transmitted, and after data transmission operations from both the sides are finished, the line is disconnected without troubling a user.

Since the line is kept connected, a user may continue an audio call since the charge remains the same. For this reason, a user may talk about another subject if he or she can know the remaining time of the data transmission. Therefore, "remaining time" is displayed in addition to the message "in transmission", so that a user can always know the remaining time. Of course, the remaining time may be displayed upon request of a user.

FIGS. 4A and 4B are flow charts for realizing the above-mentioned diagram. FIGS. 4A and 4B show a sequence executed when data is renewed in a case wherein the system of this embodiment has a scheduling function.

FIG. 4A shows a case wherein confirmation of a schedule of the owner of the portable device or postulation of an appointment is performed for the personal computer 7 via a communication. Data is received (4-1), and a command is interpreted to determine the contents of the received message (4-2; in this case, confirmation of a schedule (4-3) and postulation of an appointment (4-5) will be exemplified). If the command indicates confirmation of a schedule, schedule data on the personal computer 7 is returned (4-4). On the other hand, if the command indicates postulation of an appointment, and if the schedule has room, the appointment is registered as temporary data (4-6), and a flag indicating the presence of renewed data is set (4-7). Thereafter, a pointer of an area where the number of appointments in units of renewal data is stored as a table is stored (4-8).

FIG. 4B is a flow chart showing a case wherein a user registers or modifies a new schedule in both the personal computer and the portable electronic device. In this case, when new data is input by the portable terminal which executes steps 4-9 and 4-10 at a remote location, and the personal computer registers temporary data, the data in these two devices contradict each other, and must be matched.

Figure 4C:
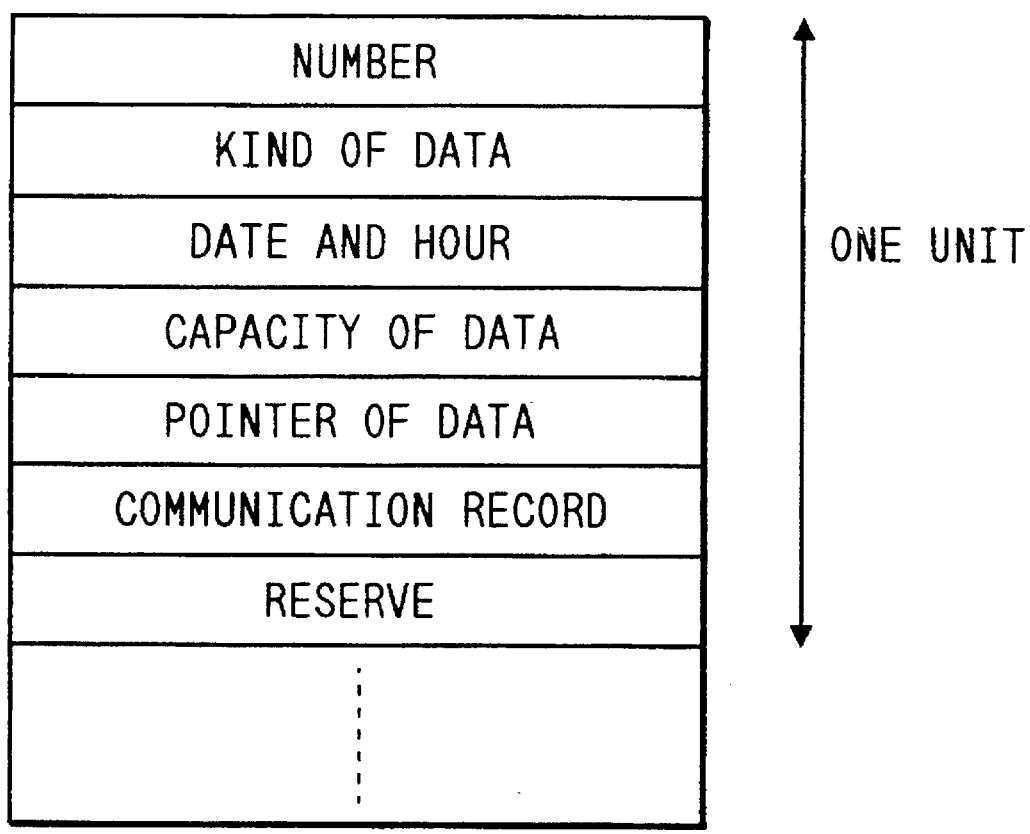

FIG. 4C shows an example of a renewal data table in the personal computer or the portable electronic device 1. In this case, a table including a number (order of reception), the kind of data (a schedule, FAX, order, or the like), date and hour, the data capacity, the pointer indicating a memory where data is actually stored, and a communication record (communication start or break) is created for one data. The number of data is equal to the number of tables.

FIGS. 5A1 and 5A2 are flow charts showing a data communication executed parallel to an audio call at the calling party when there is data to be renewed, as shown in FIG. 4C. This flow may be executed by either the personal computer 3 or the portable device 1.

As described above, a dialing operation is performed when a user connects a line as in a normal calling operation or designates a partner to be called (5-1). It is checked if the dial number to be called is a registered number (5-2). If the dial number is a number other than the registered numbers, it is determined that only an audio call is made, and no data communication is performed (5-3).

When the dial number is a registered number, the modem 4 is permitted to prepare for data transmission (5-4), and the control waits for an answer from the partner (5-5). Although not shown, when the partner is busy or does not answer the telephone call, the user hangs up the hand set to give up a call, and this flow also ends.

If the answer from the partner is received, the self ID is transmitted as data in parallel with the audio call (5-6). Then, the control waits for an ID returned from the partner (5-7), and the ID received from the partner is checked (5-8) to discriminate if the received ID is normal (5-9). When the ID is not returned from the partner over a predetermined period of time, or when the ID does not match, the flow advances to step 5-30 to perform only an audio call.

In this case, a communication need not be performed via the modem 4.

It is then checked if the renewal data flag shown in FIG. 4C is set in the calling party side (5-10). If the renewal data flag is set, data are transmitted as packets in accordance with the storage order in the data tables (5-11). Then, the two terminals exchange data capacities to be transmitted (5-25), and a time required for data transmission is calculated. The data capacity is a sum of a total of the self data tables and the capacity transmitted from the partner. A message "data communication start" is displayed on the display unit, and the remaining communication time is also displayed. Each time a data packet is transmitted, it is checked based on each ACK message returned from the partner if data is normally transmitted (5-12), and normally transmitted data is deleted from the table (5-13). It is checked if all data are transmitted (5-14). If data to be transmitted remain, the flow returns to step 5-11 to transmit the next packet.

If all data are transmitted, the flag indicating the presence of data to be renewed is reset (5-15).

If there is no data to be transmitted or if all data are transmitted, a message indicating the absence of data is transmitted (5-16), and the control waits for an answer from the partner (5-17). If the partner has data to be transmitted, the data is received (5-18); otherwise, data transmission/reception ends. In step 5-19, an audio call state is checked. If the audio call still continues, an audio call state is set. If the audio call has already been finished, and the hand set is set in the on-hook state, the line is disconnected (5-20).

Figure 17A:
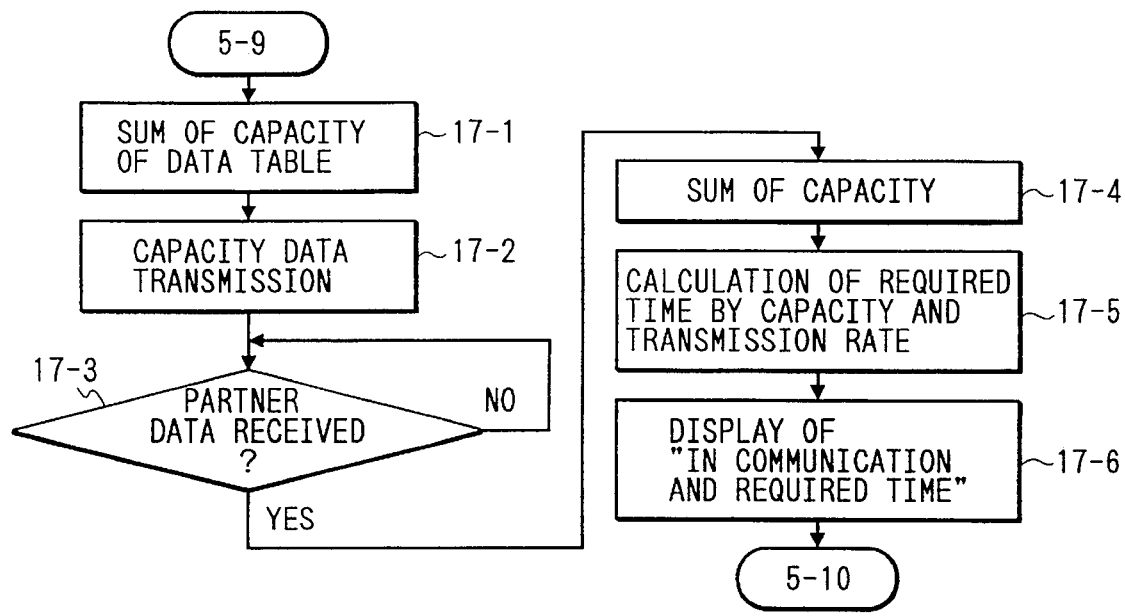
FIGS. 17A and 17B are flow charts showing an informing operation.
Figure 17B:
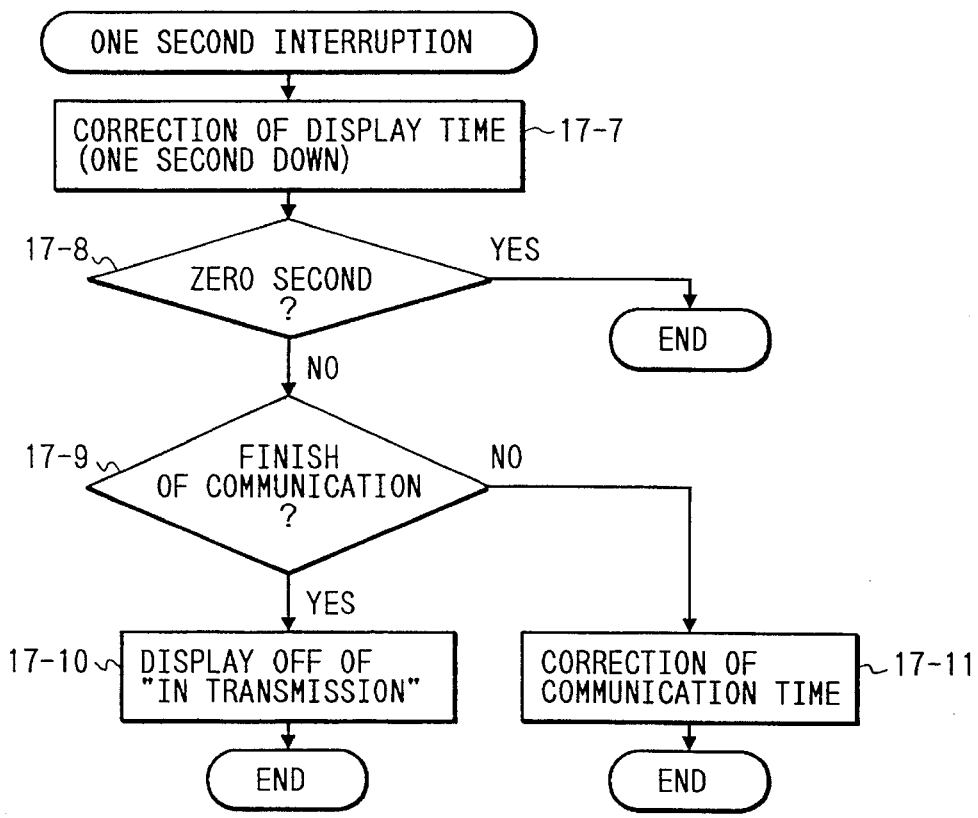

FIG. 17A shows in detail the process in step 5-25 between steps 5-9 and 5-10 in FIGS. 5A1 and 5A2. In step 17-1, the sum of the capacities of data to be transmitted of the data tables is calculated. The data indicating the sum of the capacities is transmitted to the partner (17-2), and partner data is received (17-3). Then, the received data is added to the self data capacity (17-4). An actual transmission time is calculated based on the data capacity and the transmission rate, and a time required for a procedure is added by experience to the calculated transmission time, thereby obtaining a required time (17-5). A message "in communication" and the required time are displayed on the display 14. FIG. 17B is a flow chart showing correction of the required time after the time begins to be displayed. Although a one-second interruption is utilized by the system for various purposes, only this portion will be explained below. The display time is decremented by 1 second (17-7), and it is checked if the display time has reached zero second (17-8). If the display time has not reached zero second yet, the flow ends; otherwise, it is further checked if a communication has actually been finished (17-9). If the communication has been finished, the message "in transmission" is turned off (17-10). However, if the communication has not been finished, since a time error has occurred in an actual audio call, the time is set again based on the current communication progress state (17-11).

Figure 5B:
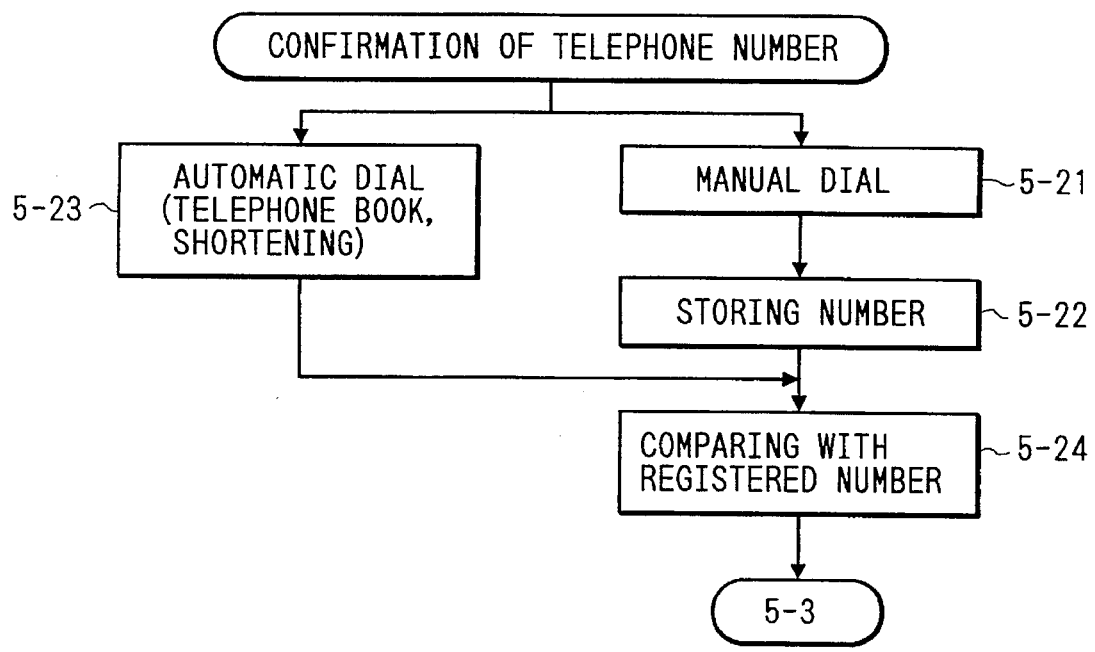
FIG. 5B is a flow chart at the transmitting side according to the embodiment of the present invention.

The process for confirming a telephone number in step 5-2 shown in FIG. 5A1 will be described below with reference to FIG. 5B. This process is divided into two modes depending on how to set the telephone number. The first mode corresponds to a case wherein a telephone number is manually input (5-21). In this mode, in the electronic device 1, the telephone number is input by depressing a soft ten-key pad displayed on the display screen with a pen. In a general notebook type personal computer, the telephone number is input by depressing numeric keys on the keyboard or keys on the ten-key pad. Since the keyboard or the ten-key pad is an input device of an electronic device, the depressed number can be recognized in a software manner. The input number is sequentially stored (5-22). In the second mode, a pre-stored number such as a number stored in an address book, telephone book, or abbreviated dial in the electronic device is called using an associated key without directly depressing keys (5-23). At this time, a number to be called is detected as soon as it is designated by a user. The input telephone number is compared with a registered number to be transmitted to check if the two numbers coincide with each other. Note that the presence/absence of, e.g., an area code can be estimated at this time.

Figure 6B:
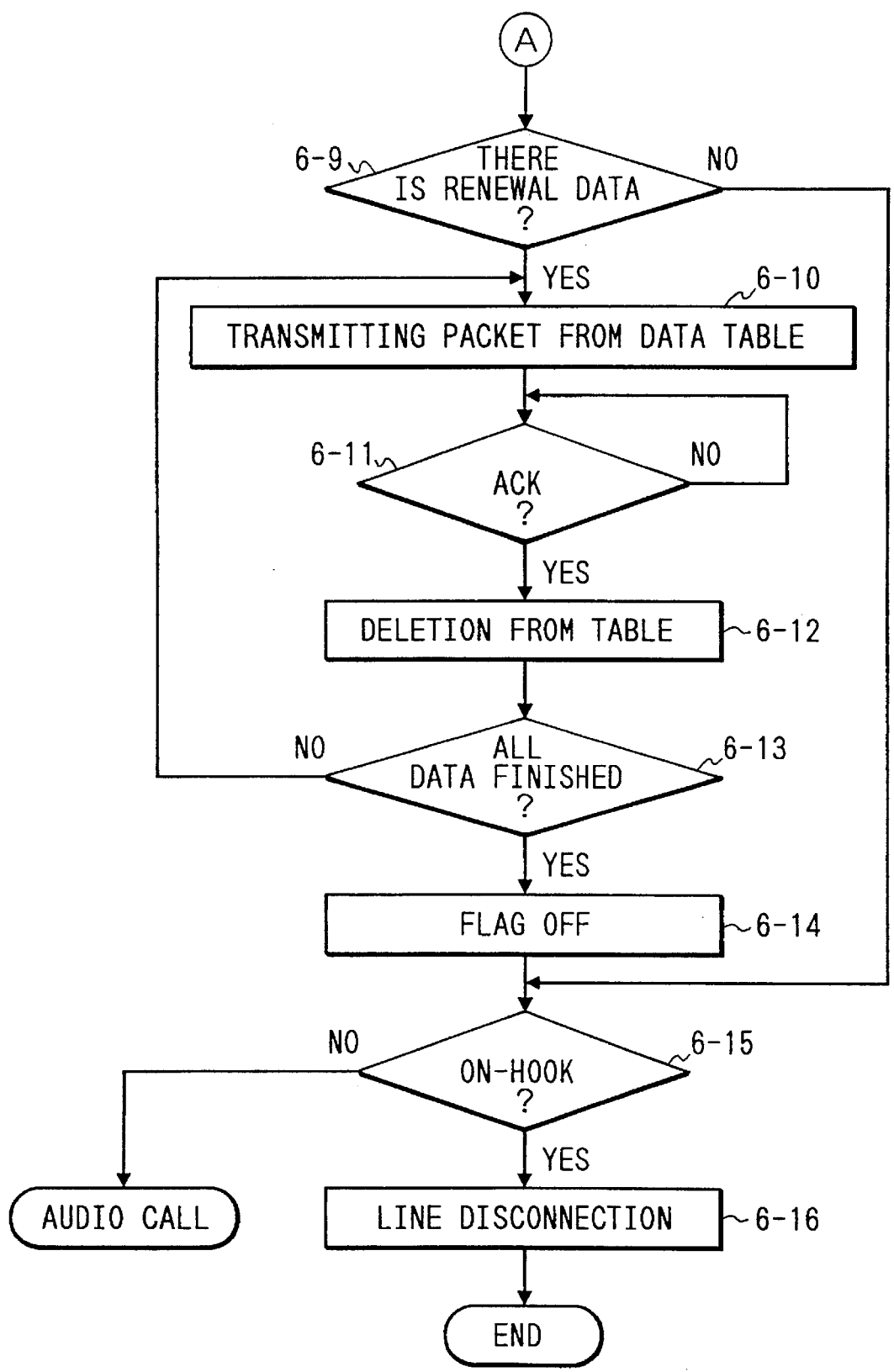
FIG. 6 is comprised of FIG. 6A and FIG. 6B showing flow charts at the receiving side according to the embodiment of the present invention.

FIGS. 5A1, 5A2 and 5B show the control flow of the device at the calling party side. On the other hand, FIGS. 6A and 6B show the control flow of the device at the called party side.

Since these flows include basically the same portions, only differences between them will be explained below. The bell of the telephone rings, and someone answers. On the side of the called party, since the calling party is unknown, the controls waits for information data transmitted from the data side (6-3). If no data is received for a predetermined period of time, it is determined that a call is generated by a normal telephone which has no simultaneous communication function of audio data, and thereafter, an audio call is started. On the other hand, if an ID is transmitted and is proper, partner data is received, and then, data on the called party side is transmitted (other detailed operations are the same as those in FIGS. 5A1, 5A2 and 5B, and a detailed description thereof will be omitted).

Figure 7:
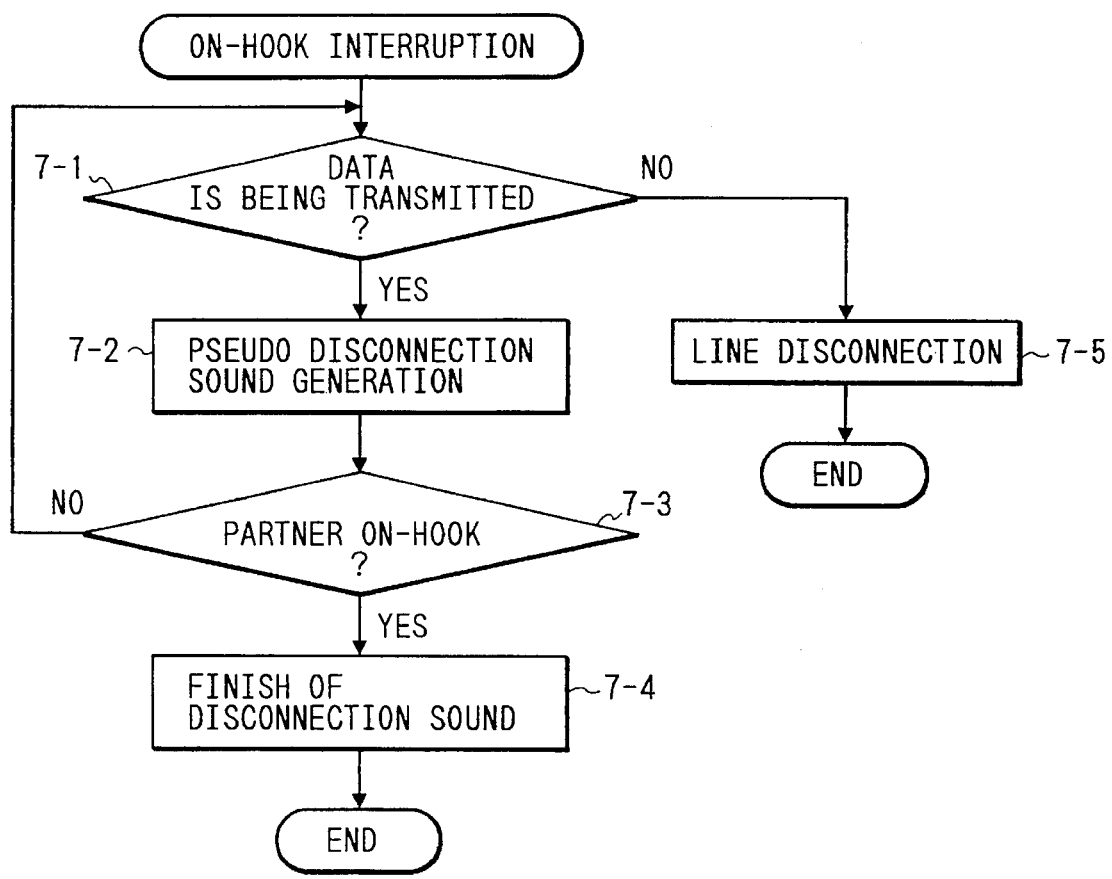
FIG. 7 is a flow chart showing an interruption routine according to the embodiment of the present invention.

FIG. 7 shows an interruption process upon completion of an audio call. When a user clearly indicates his or her intention to end the audio call (e.g., when the user sets the hand set in an on-hook state or designates the hook icon), an interruption is generated, and the flow shown in FIG. 7 is executed.

In this service routine, it is checked if data is being transmitted (7-1). If it is determined that data is being transmitted, the line is held, and a disconnection tone is generated so that the partner hears a tone as if the user on this side hangs up the telephone (7-2). It is observed if the partner hangs up the telephone (the partner sets the hand set in the on-hook state) (7-3). If the partner sets the hand set in the on-hook state to end the audio call, tone generation ends (7-4). Even when the partner does not set the hand set in an on-hook state, if data transmission has been finished, the flow branches to step 7-1, and the line is disconnected (7-5).

Figure 18:
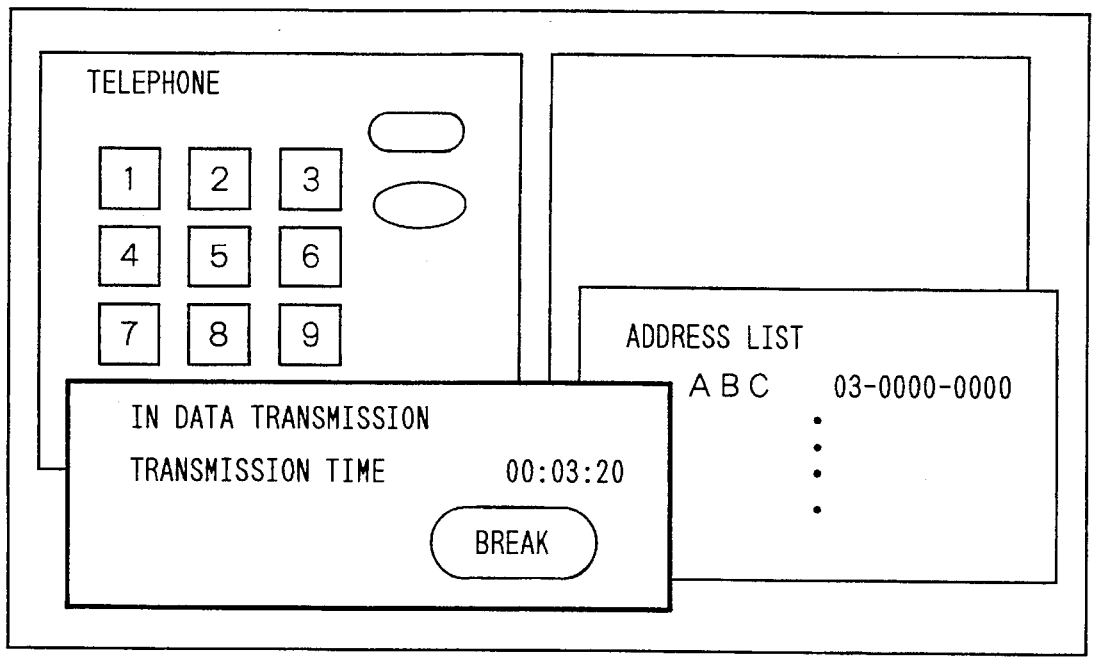
FIG. 18 is a plan view showing an example of a display unit as information means.
Figure 19:
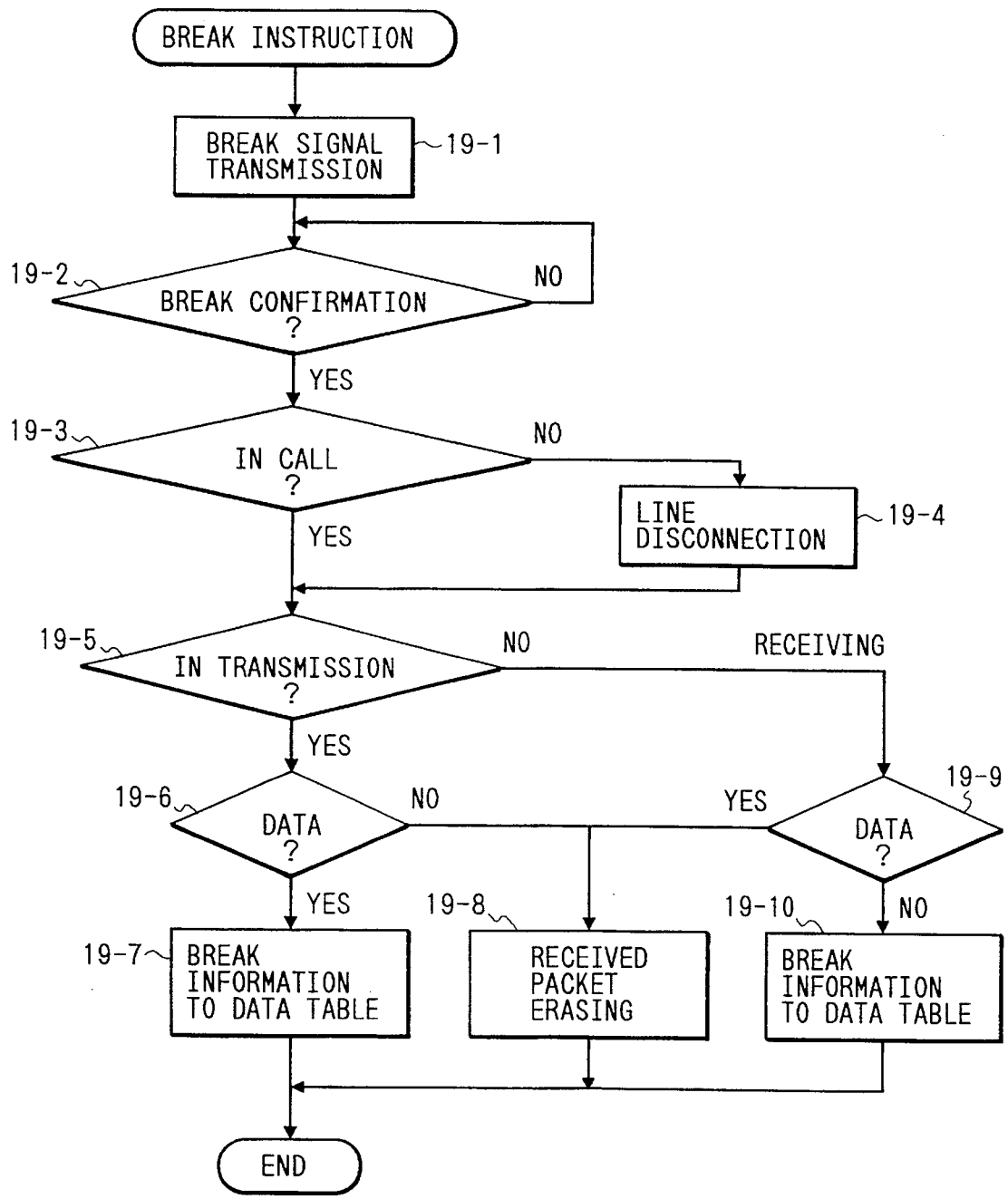
FIG. 19 is a flow chart showing an operation when a break instruction is issued.

FIG. 18 shows an example of the display screen. In this embodiment, as one of multi-windows, a message "in data transmission" and the required transmission time are displayed. When a user wants to break a communication, he or she can click a "break" icon or touch it with a pen. FIG. 19 shows an operation executed when a break instruction is issued.

A break message is transmitted in place of the message "in data transmission" (19-1), and the control waits for an agreement from the partner (19-2). It is checked based on the on/off-hook state of the hand set if an audio call is being performed (19-3). If it is determined that the audio call has ended, the line is disconnected (19-4). Then, a process of data which has been transmitted to the middle of it is executed. It is checked if data or an ACK signal is being transmitted from this side upon the break instruction (19-5). If data or an ACK signal is being transmitted, it is checked if data is being transmitted (19-6). If data is being transmitted, a break message is stored in a communication record of the corresponding data table (19-7), and thereafter, the flow ends. On the other hand, if an ACK signal is being transmitted, the currently received data packet is erased (19-8). At the receiving side, data or an ACK signal is similarly checked (19-9), and the same process is executed (19-10).

Figure 20:
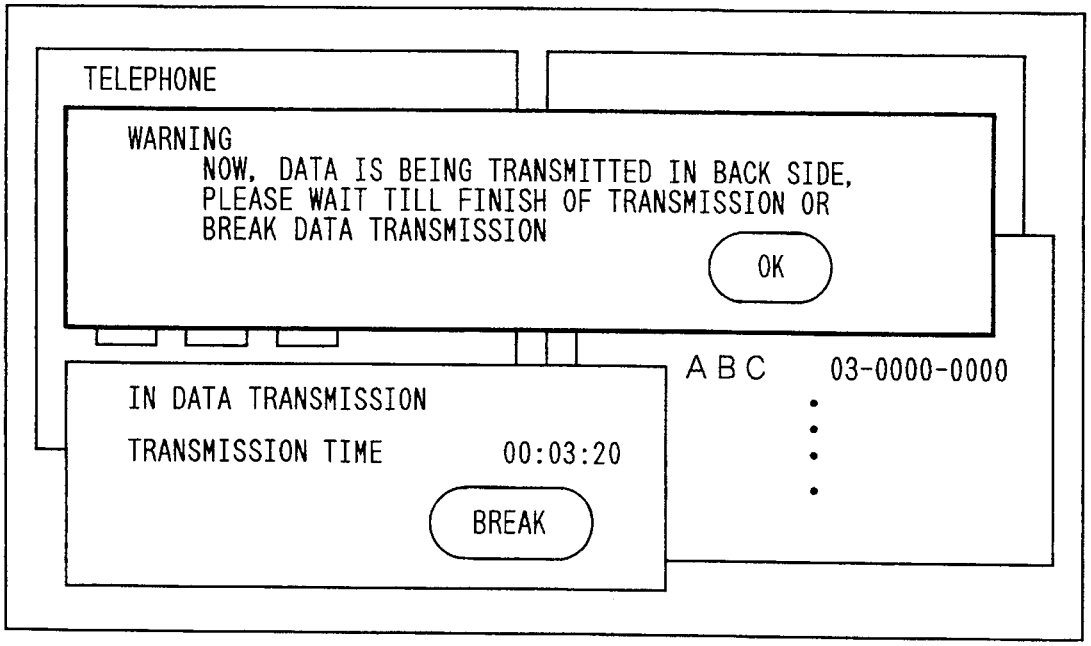
FIG. 20 is a plan view showing a modification of the display unit as the information means.

Furthermore, although the message "in data communication" is informed, when a user temporarily ends an audio call, and indicates an intention to start an audio call again by setting the hand set in an off-hook state, a warning message shown in FIG. 20 is displayed, and the next audio call operation is inhibited from being started. A user can start the next audio call after he or she waits for the end of the data communication or by ending the communication by the break instruction.

Second Embodiment

In the above embodiment, a message display on the display 14 is used as information means to a user.

This embodiment will exemplify a case wherein the information means generates audio information using the audio signal generation means 19.

Figure 21A:
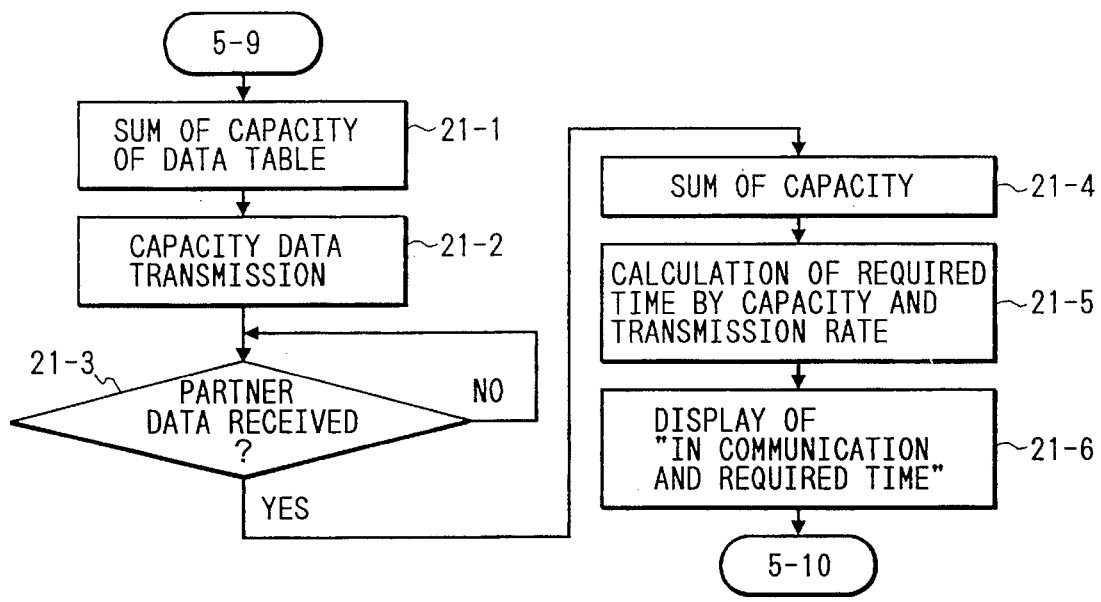
FIGS. 21A and 21B are flow charts showing a modification of the operation shown in FIGS. 17A and 17B.
Figure 21B:
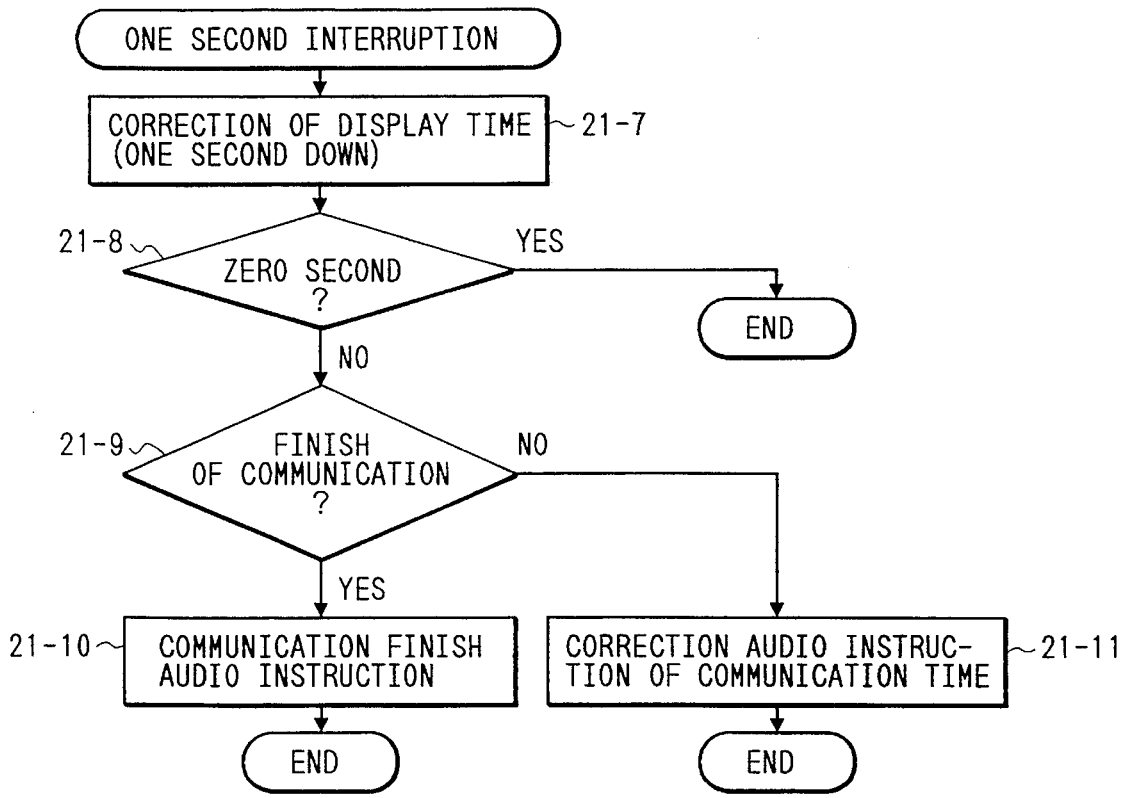

FIGS. 21A and 21B are flow charts showing a modification of FIGS. 17A and 17B, and only differences from FIGS. 17A and 17B will be explained below. When data transmission is started (21-6), an audio message "data communication is started, communication time is three minutes" is generated by the audio signal generation means 19 to be superposed on a normal audio call. Alternatively, a user may recognize the start of data communication by generating a predetermined tone of, e.g., a buzzer, a chime, or the like. Upon finishing of communication, an audio message "data communication finished" is generated or a predetermined tone is generated (21-10). When the communication time is corrected (21-11), the corrected time is informed.

Furthermore, although the message "in data communication" is informed, when a user temporarily ends an audio call, and indicates an intention to start an audio call again by setting the hand set in an off-hook state, for example, an audio message "in data communication, please wait for one minute" is informed to the user via the hand set.

In the above description, visual information and audio information have been exemplified as different embodiments. However, information as a combination of visual information and audio information may be made.

As described above, according to this embodiment, if data and an audio signal can be simultaneously transmitted, even when a user makes a telephone call for the purpose of an audio call, data can be automatically renewed without troubling the user, thus improving operability. Furthermore, since the data communication state is informed, an audio call can be effectively made to the end of the data communication time.

Furthermore, when the user attempts to start the next audio call before data communication is finished, a warning message is generated, and reliability of data transmission can be improved.

In each of the above embodiments, when the modem which can simultaneously transmit audio and data signals is used, and when both the transmitting and receiving sides have data to be renewed, data communication is informed to a user upon exchange of data as a background call of a normal audio call of the user.

First Modification

In each of the above embodiment, as discrimination means for discriminating if a communication partner is a specific one, a number input by depressing push buttons or a soft ten-key pad (telephone screen) as telephone number confirmation means or by registering names is monitored, and is compared and discriminated with abbreviated dials or an address book (telephone book).

In this modification, a number can be monitored even when an electronic device which does not have such a telephone function, i.e., the notebook type personal computer 3 in, e.g., FIG. 1, generates a dial signal using an external portable wireless telephone.

Figure 8:
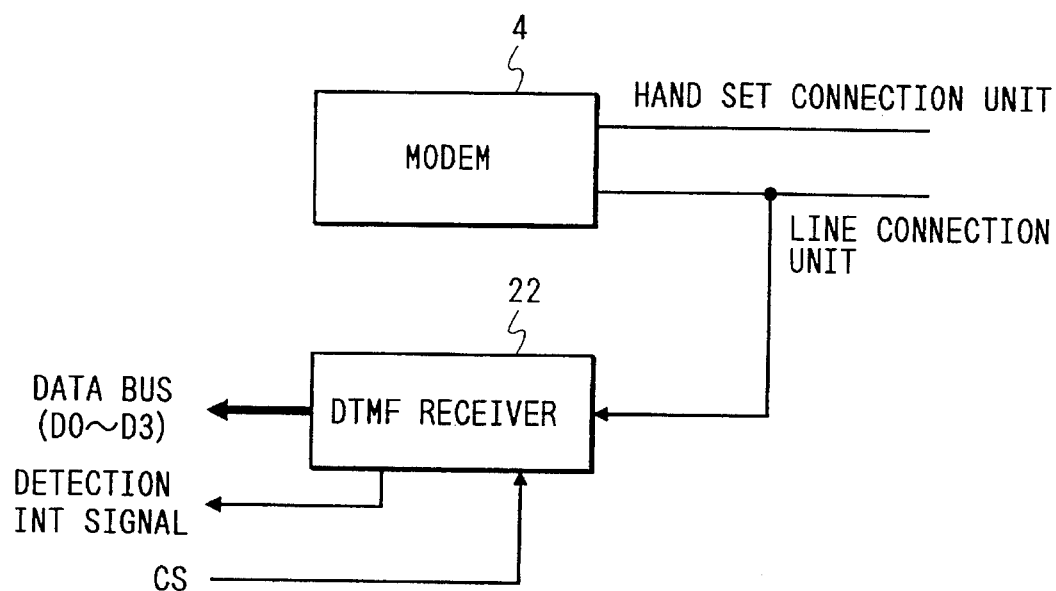
FIG. 8 is a diagram showing a dial monitor according to the embodiment of the present invention.

FIG. 8 shows the arrangement of this modification. In this modification, a DTMF receiver 22 for monitoring a dial signal DTMF output from a portable telephone is added to the modem 4 (PCMCIA card) inserted in the notebook type personal computer 3. The DTMF receiver is a commercially available IC. Upon detection of a DTMF signal, the DTMF receiver generates an INT (interruption signal) and sequentially informs the input number to the system. This signal is stored in step 5-22 in FIG. 5B. For this reason, even when an external telephone is used, whether or not a user is trying to make a telephone call to a registered partner can be discriminated.

Second Modification

In the description of each of the above embodiments, the renewal data table has only one transmission path. However, in some cases, data must be transmitted to terminals corresponding to different kinds of information (e.g., a user must transmit schedule data to his or her own personal computer in a branch office, and must transmit order data to a host computer of the head office).

Figure 9B:
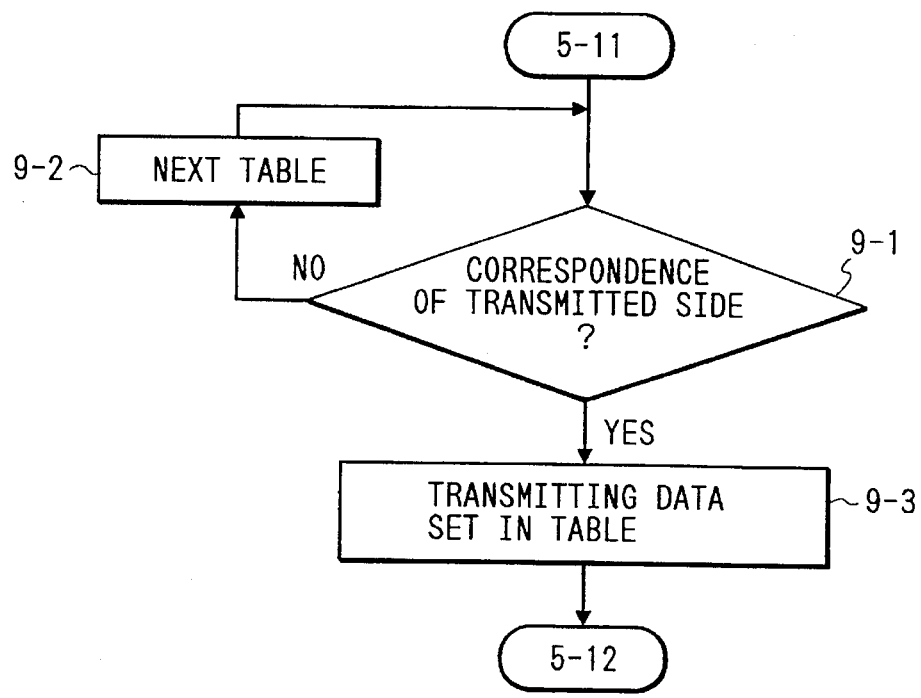
FIGS. 9A and 9B are respectively a table and a flow chart for discriminating whether or not a communication partner is a specific one.
Figure 9A:
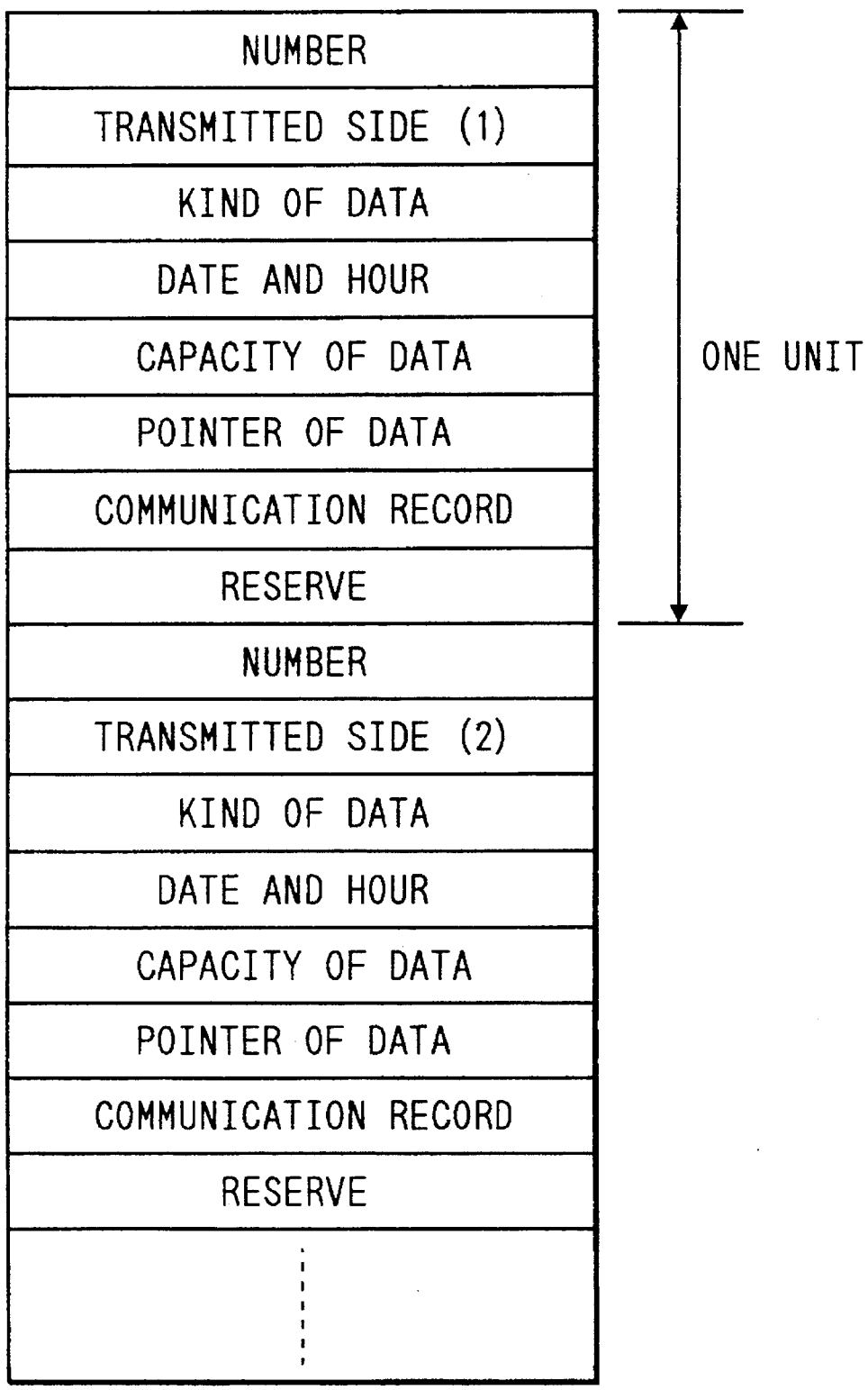

FIG. 9A shows a plurality of data tables in which transmitted sides or data destinations can be respectively set. Each application has a default transmitted side (in this case, a user must transmit schedule data to his or her own personal computer in a branch office). However, the transmitted sides may be individually set by a user. In step 5-11 in FIG. 5A2, as shown in FIG. 9B, it is checked if data in each table coincides with the transmitted side of a telephone number of the current called party (9-1). If a non-coincidence is found, the next table is looked up (9-2); otherwise, data is transmitted (9-3). Thereafter, the flow returns to step 5-11 in FIG. 5A.

In this manner, data can be transmitted to any of a plurality of transmitted sides. Furthermore, renewal data presence flags may be formed in correspondence with transmitted sides of renewal data.

Third Modification

In each of the above embodiment, when either one of users calls, renewal data are automatically exchanged as a background call. However, it is preferable that confirmation of a schedule or transmission of urgent facsimile data be performed at given time intervals regardless of a manual telephone call by a user.

In this modification, upon renewal of data, a timer set in correspondence with the urgency level of the renewed data is started, and if no telephone call is received after an elapse of a time determined by the timer, a message indicating this is informed to a user or automatic transmission is performed.

Figure 10C:
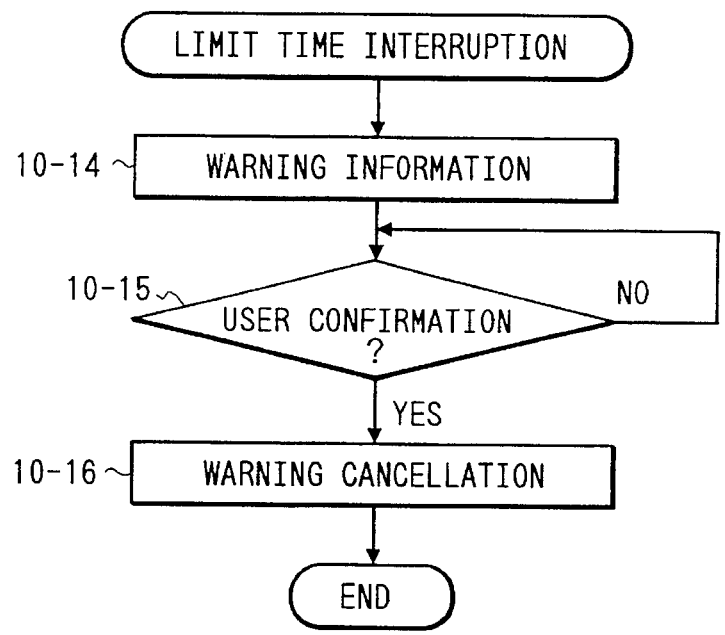

FIGS. 10A to 10D are flow charts showing an operation executed upon renewal of data. The operation shown in FIGS. 10A and 10B is substantially the same as that shown in FIGS. 4A and 4B. When data is set in a renewal data table, a timer is set in accordance with the kind of the set data (10-9 or 10-13). For example, one hour is set for renewal data of a scheduler and data for registering temporary data, and 20 minutes are set for reception of facsimile data. Note that the time to be set in the timer may be a default value, as described above. However, when a schedule is confirmed using a currently proposed network description language, the renewal limit time may be set and transmitted in a command interpreted in step 10-2.

FIG. 10C shows a case wherein warning information is generated for a user by an interruption routine executed when the time limit timer overflows. Prior to the interruption routine, if the power supply of the electronic device is OFF, the power supply is turned on as in an alarm operation. In order to inform the time limit to a user, a message for urging a user to renew data is displayed on the screen of the display 14 together with an audio warning by, e.g., a buzzer (10-14). On this screen, the type of data, the partner to which data is to be transmitted, the telephone number, and the like are displayed. By confirming the intention of the user by displaying a message "OK?" (10-15), the display 14 is turned off (10-16), and the flow ends. Alternatively, if the user clicks the message "OK", an on-hook dial operation of the telephone may be automatically started.

Figure 10D:
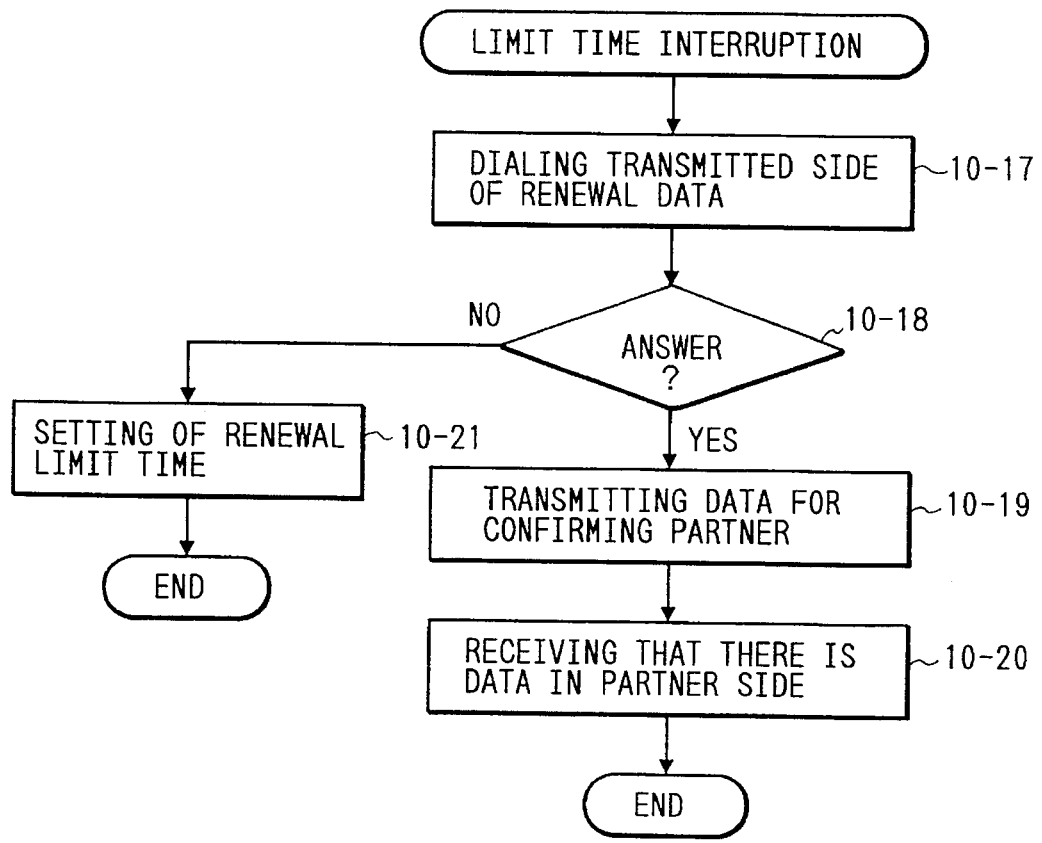

FIG. 10D shows an example of automatic renewal. An on-hook dial operation is automatically performed to a transmitted side by the interruption routine (10-17). However, if the user currently uses his or her own telephone, even when this interruption is generated, a service cannot be immediately started. For this reason, the time is set again, and the flow ends.

It is checked based on the calling tone of a partner if the partner answers (10-18). If the partner answers, each device confirms the other (10-19). If the partner can be confirmed (10-20), all data to be renewed in tables are renewed.

If the partner does not answer for a predetermined period of time or longer after the calling tone is generated, or if the partner's telephone is busy, a predetermined time is set in the timer, and the flow ends.

As described above, in this embodiment, when data is not renewed for a predetermined period of time or longer, a warning message is informed to a user or data is automatically transmitted. For this reason, data can be matched within the predetermined period of time, and information can be transmitted quickly. This modification can be applied regardless of a condition for simultaneously transmitting data and audio signals.

As described above, according to this embodiment, if data and an audio signal can be simultaneously transmitted, even when a user makes a telephone call for the purpose of an audio call, data can be automatically renewed without requiring an operation of the user, thus improving operability. Furthermore, since a single line can be used for two purposes, the call charge can be saved.

Fourth Modification

Figure 11:
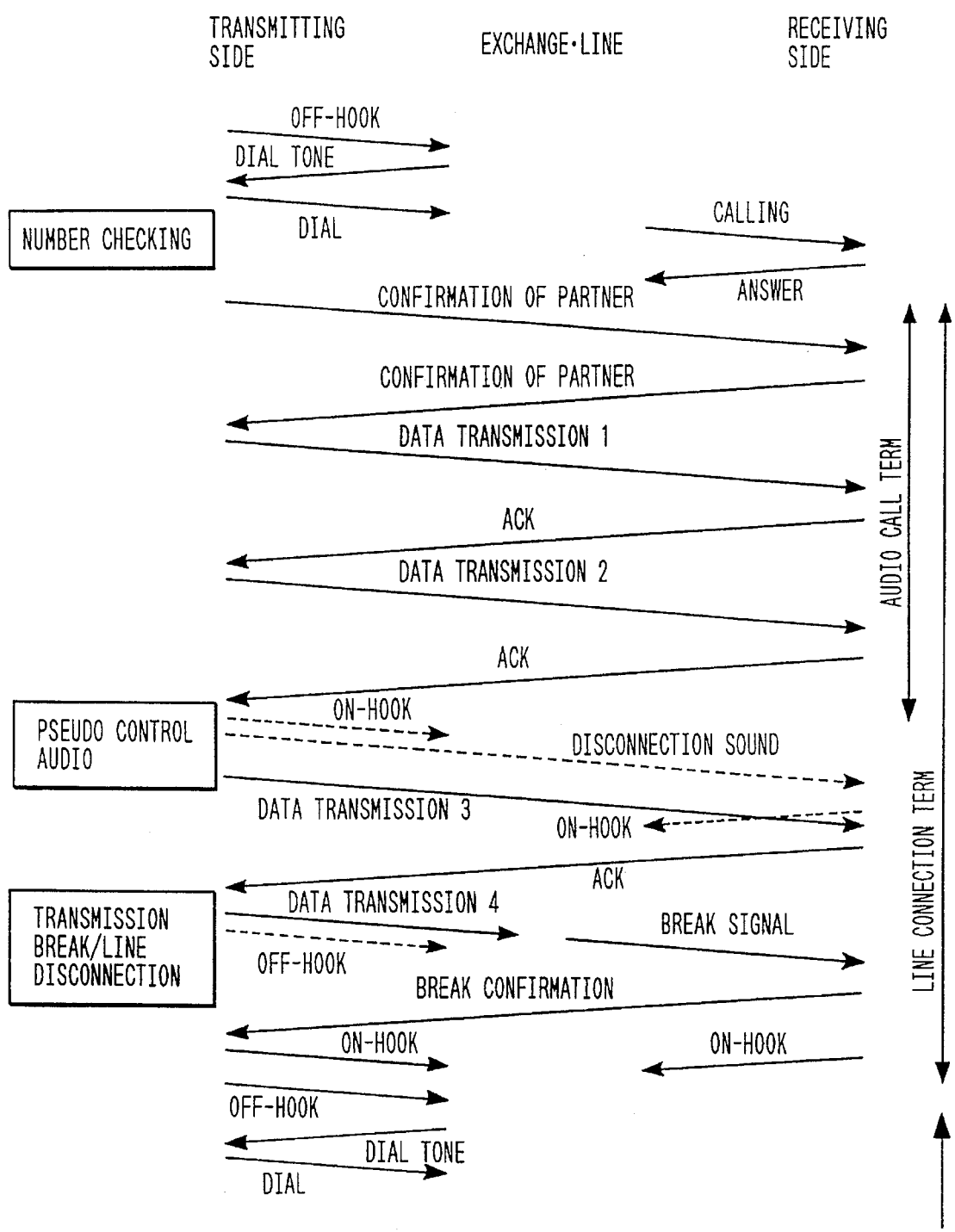
FIG. 11 is a communication diagram when a communication is broken.

FIG. 11 is a diagram showing a countermeasure taken against a case wherein a user sets the hand set in an off-hook state to make another audio call or operates the hook icon on the screen when an audio call is finished during a data communication in the first embodiment described above.

In the modification shown in FIG. 11, renewal data can be transmitted as a background call without troubling a user while the user makes an audio call. In this case, when the user finishes the audio call and wants to start another audio call, the data communication is immediately broken and the line is disconnected to prepare for the next audio call. In order to break data, a break command is transmitted in place of data, and a partner returns a break confirmation message to disconnect the line. Then, an off-hook state is set to allow the next audio call, so that the user can dial. FIG. 11 shows a case wherein the transmitting side is set in an off-hook state during transmission. Of course, if either the transmitting or receiving side starts another audio call, the same operation as described above is performed.

Figure 12:
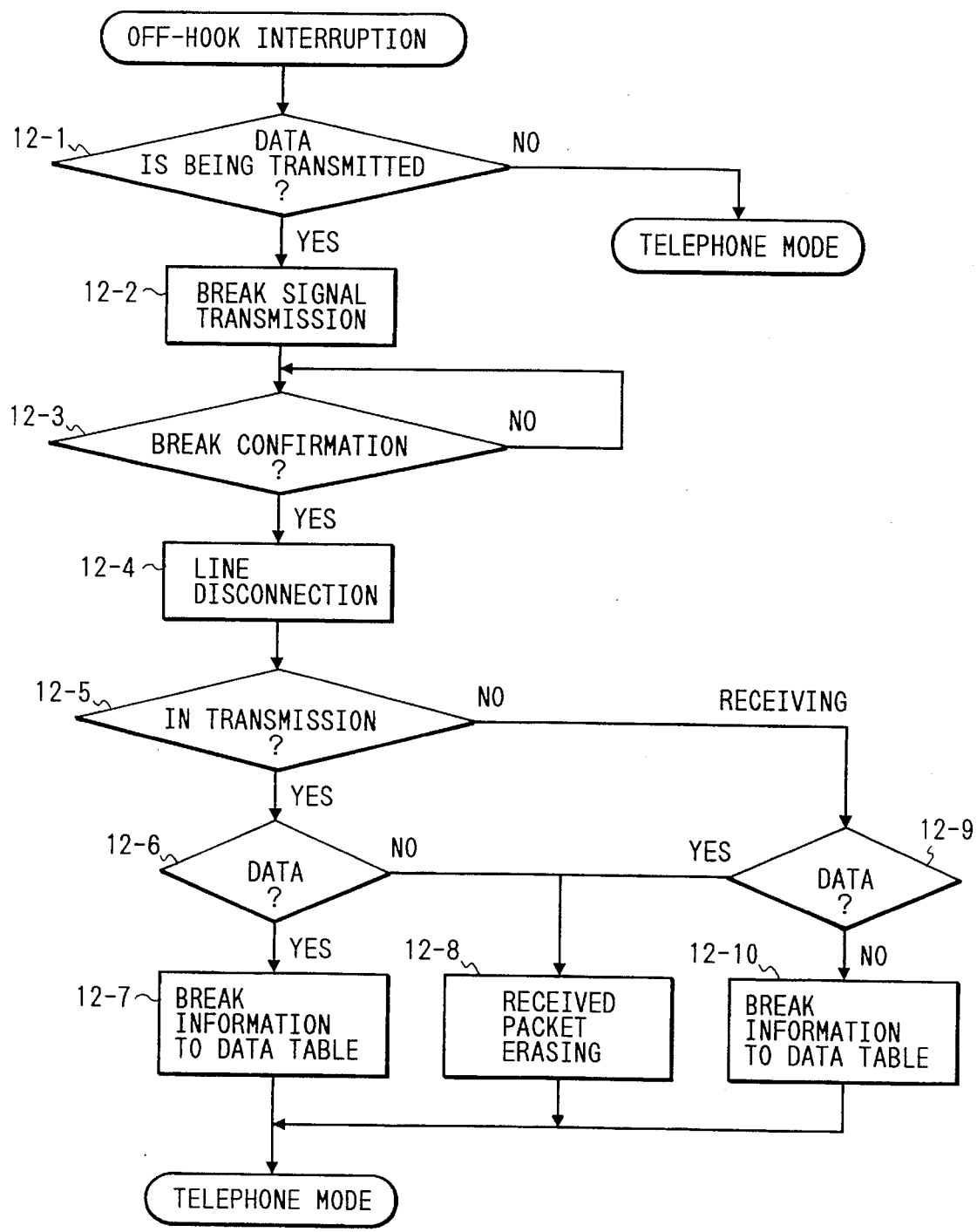
FIG. 12 is a flow chart at an audio call requesting side.

FIG. 12 is a flow chart of a device with which a user attempts to start another audio call. Since the user indicates an intention to start an audio call by setting the hand set in an off-hook state or operating the hook icon on the screen, an interruption routine is executed in response to this operation as a trigger. This electronic device checks if a background communication is being executed (12-1). If no background communication is performed, a normal telephone mode (FIGS. 5A1, 5A2 and 5B) can be started. If a background communication is being performed, the data communication is temporarily finished to immediately break the data communication, so that the user may not be troubled with an operation in association with the data communication, and a break command is transmitted (12-2). The control waits for a confirmation message returned from a partner (12-3), and thereafter, the line is disconnected (12-4). Then, a process for data which has been transmitted to the middle of it is executed. For example, a process for allowing a re-transmission process later is performed. It is checked if data or an ACK signal is being transmitted from this side upon the break instruction (12-5). If data or an ACK signal is being transmitted, it is checked if data is being transmitted (12-6). If data is being transmitted, a break message is stored in a communication record of the corresponding data table (12-7), and thereafter, the telephone mode is started. If the ACK signal is being transmitted, the currently received data packet is erased (12-8). At the receiving side, data or an ACK signal is similarly checked (12-9). In this case, if data is being transmitted, the data is erased; if an ACK signal is being transmitted, a break message is stored in a communication record of the corresponding data table, and the telephone mode is started.

Figure 13:
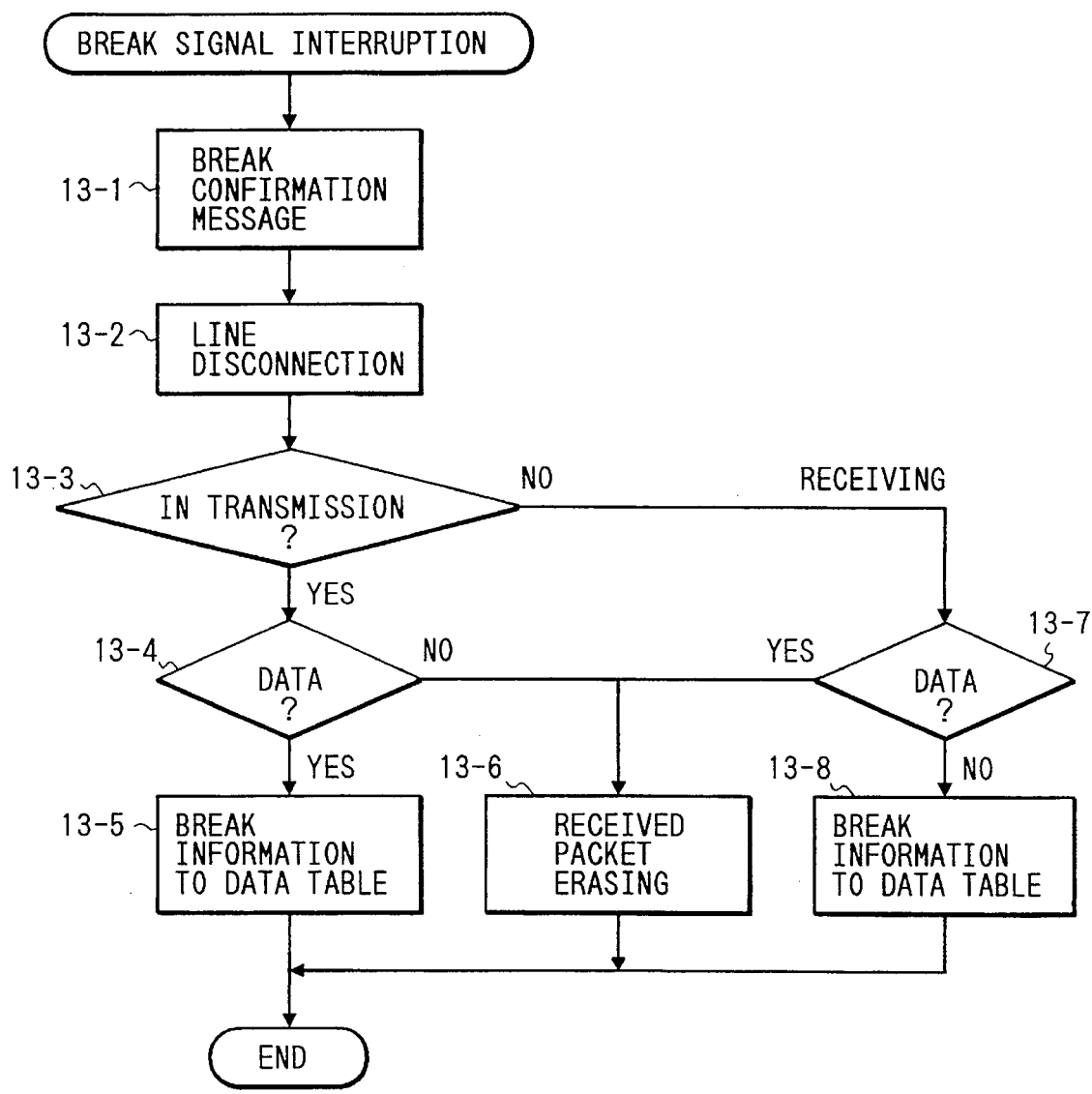
FIG. 13 is a flow chart at a partner side.

FIG. 13 is a flow chart of the electronic device at the transmitted side. In the case of this interruption, normal data is abnormally terminated (ECC error), and a break command is subsequently received, thus starting a break routine. A break confirmation message is returned (13-1), and the line is disconnected (13-2). Similarly, depending on the transmission/reception state, a process for erasing data or the like is performed so as to prevent an abnormality caused by data which has been received to the middle or a message (13-3 to 13-8).

With this operation, the electronic device finishes a communication, and returns to a default state.

As described above, in each of the above modifications, when the modem which can simultaneously transmit audio and data signals is used, and when both the transmitting and receiving sides have data to be renewed, the data can be exchanged as a background communication of a normal audio call of the user without any operation of the user.

Fifth Modification

Unlike in the above embodiments, in some cases, it is preferred that data transmission be performed first depending on the urgency or importance of the data.

In this modification, when a user attempts to make another audio call before data transmission of specific data set by the user or a specific kind of data (e.g., order data) is finished, a message indicating that important data is being transmitted, and an audio call cannot be immediately started is informed.

Figure 14:
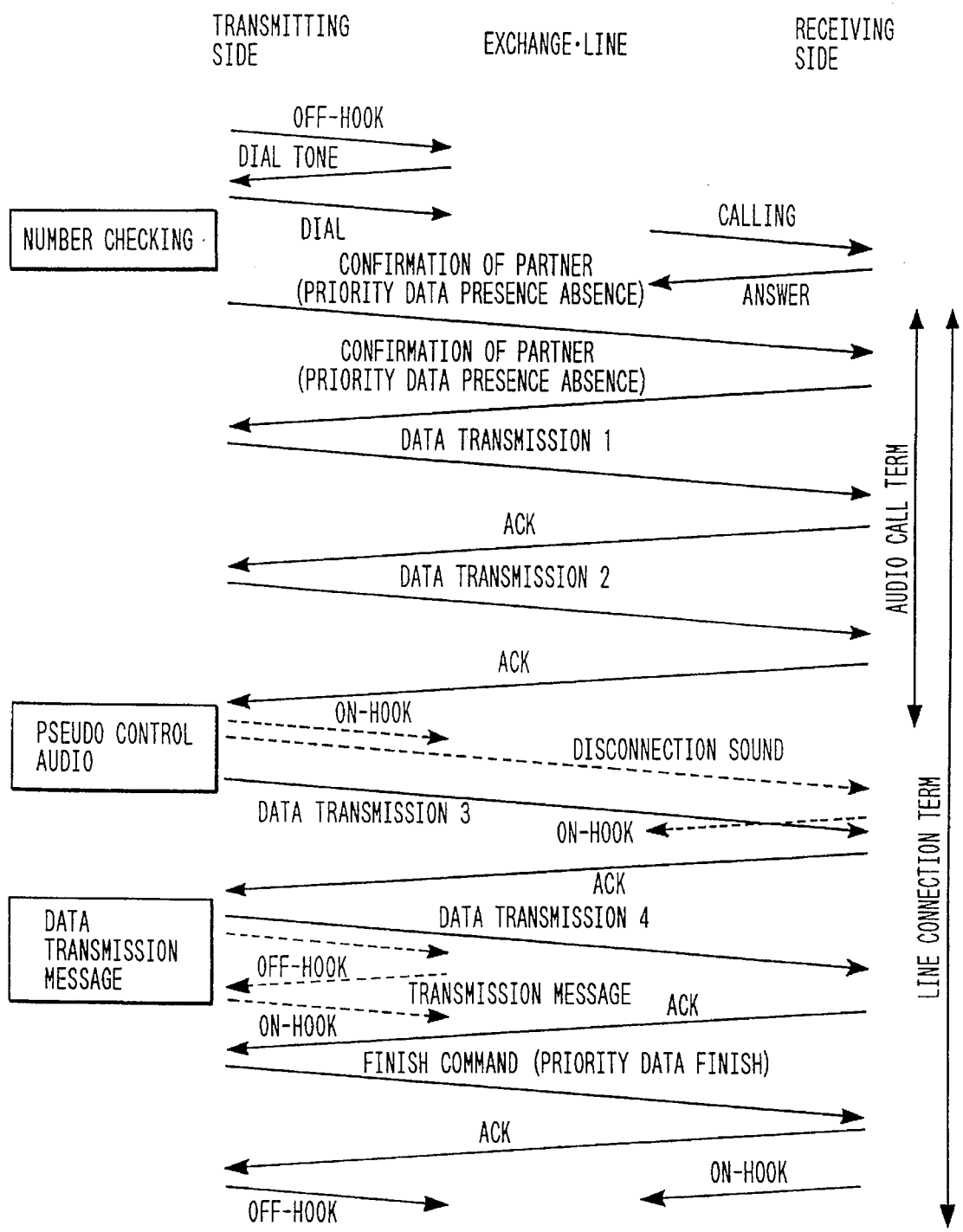
FIG. 14 is a communication diagram according to the second embodiment of the present invention.

FIG. 14 is a diagram of this operation. Upon confirmation of a partner, a message indicating whether or not priority data (with a priority flag) is present is added in the current data table. When a user performs an off-hook operation, it is checked if the priority data is being transmitted. If the priority data is being transmitted, an audio message "in data communication" is generated for a user via the hand set, and a visual message is also displayed on the display screen, thus practically inhibiting the user from calling. Although not shown, upon completion of transmission of the priority data, a priority data finish message is added to the end of data. Thus, the presence of priority data can be confirmed at both the sides. In the above embodiments, data are transmitted in the order from data stored earlier (with smaller table numbers). However, in this modification, data are transmitted in the order from those with a priority flag in accordance with the priority flag.

Figure 15:
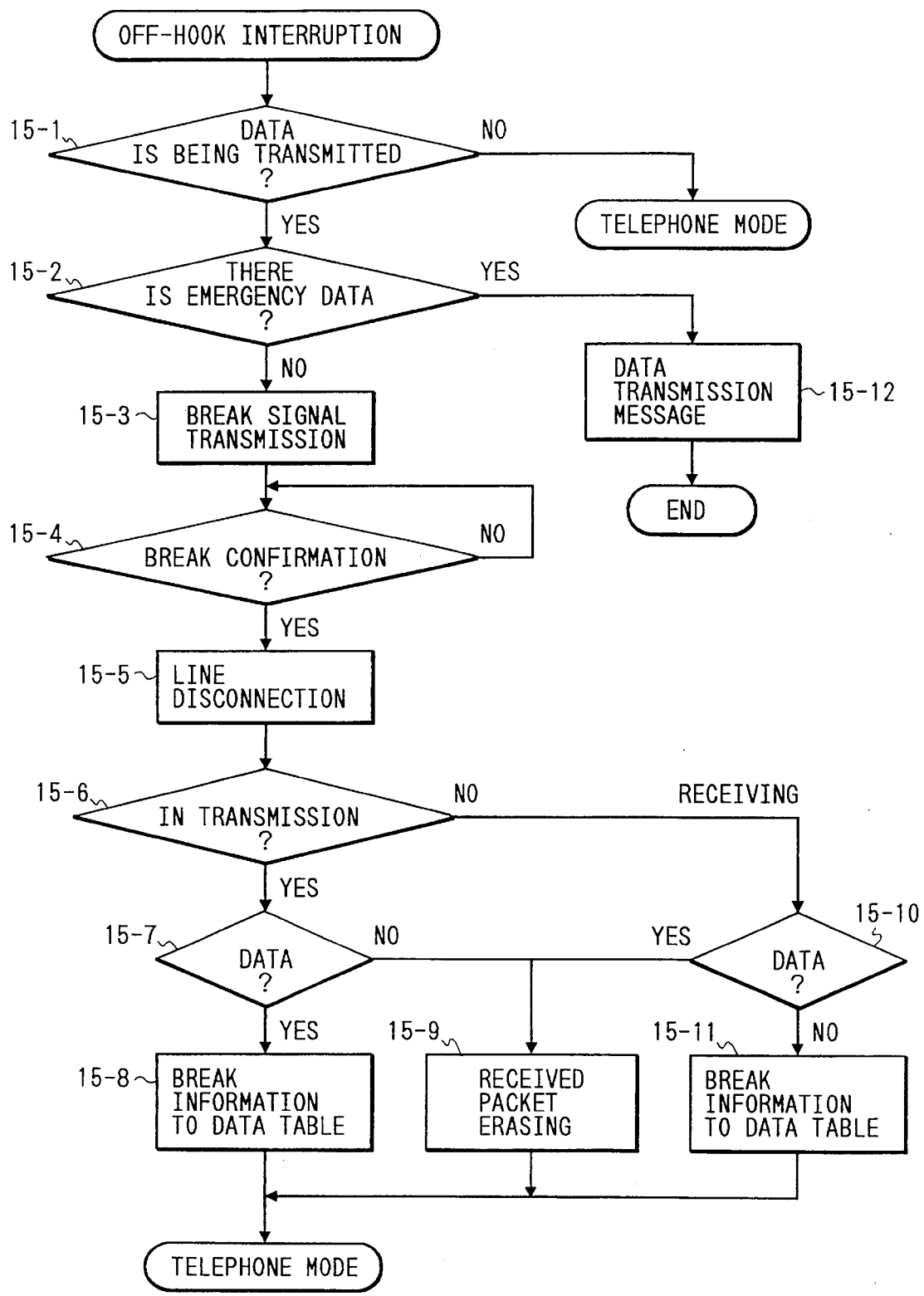
FIG. 15 is a flow chart at an audio call requesting side.

FIG. 15 is a flow chart showing an operation executed at this time.

In this case, this operation is executed by an interruption according to an off-hook operation. Upon generation of this interruption, it is checked if data is being transmitted (15-1). If data is not transmitted, the telephone mode is set. However, if data is being transmitted, the presence/absence of priority data is checked (15-2). The presence/absence of priority data can be discriminated by checking whether or not all data added with a priority flag in the data table shown in FIG. 16 have already been transmitted to or from a partner. The presence/absence of priority data in the partner device can be checked based on a priority data presence message and a priority data finish message transmitted upon initial confirmation of the partner. Priority data in the table can be set as default data by setting the kind of data (e.g., an order slip) by a user, or can be independently set when, e.g., an urgent meeting is scheduled. When a schedule confirmation command described in the above-mentioned network description language is received from a third party, since the description language can present the importance level, the command is interpreted and a priority flag is set.

If the priority data is present, the flow branches from step 15-2 to step 15-12, and an audio warning message "in data transmission" may be generated by synthesizing audio information generated by the audio signal generation means 19, or a warning tone (buzzer) may be generated to call user's attention and a message "in data transmission" may be displayed on the display. Furthermore, the display of the soft dial keys for the telephone mode may be turned off to actually inhibit calling. On the other hand, if no priority data is present, the same process as that described above with reference to FIG. 12 is executed.

When transmission of priority data has been finished, the electronic device informs the end of transmission to the user, and permits use of the telephone. More specifically, a message "finish of priority data transmission" or "use of telephone permitted" is displayed to be informed to a user.

As described above, according to this modification, if data and an audio signal can be simultaneously transmitted, even when a user makes a telephone call for the purpose of an audio call, data can be automatically renewed without any operation of the user, thus improving operability. Furthermore, since a single line can be used for two purposes, the call charge can be saved.

Furthermore, when a user attempts to start the next audio call before transmission of data which is required to be transmitted at an early timing is finished, a warning message is generated, thus improving reliability of data transmission.

Another Embodiment

In the above description, audio information is generated at an arbitrary timing. Furthermore, means for detecting the audio level of audio information on the line is added in the audio signal generation means 19 to discriminate if a user is making an audio call or between words, and control may be made to start an audio message at a timing between words.

Furthermore, attention of users may be called by generating a buzzer or chime tone, and when the audio level detection means detects that the audio calls of these users have stopped, an audio message may be started. With these means, an audio message can be generated without disturbing an audio call, and can be reliably transmitted to the users.

The audio level detection means monitors an audio line (connected to the hand set) after the modem 4 separates data and audio signals, and detects in an analog manner (comparator) or a digital manner (comparison after A/D conversion) whether or not a sum of transmitted/received levels is equal to or higher than a predetermined level.

According to this embodiment, when data and audio signals are simultaneously transmitted/received, a user can recognize a data communication state.

What is claimed is:

1. A communication apparatus comprising:
   data communication means capable of transmitting or receiving audio signals while substantially simultaneously transmitting or receiving data signals;
   information means for informing a data transmission or reception state by said data communication means to a user who is performing an audio call using said data communication means; and
   means for inhibiting the user from generating a new call while said data communication means is executing transmission or reception of data signals.

2. An apparatus according to claim 1, wherein said data communication means comprises means capable of time-divisionally transmitting or receiving said audio and data signals.

3. An apparatus according to claim 1, wherein said data communication means comprises means for modulating said audio and data signals with different carrier frequencies.

4. A communication apparatus comprising:
   data communication means capable of transmitting or receiving audio signals while substantially simultaneously transmitting or receiving data signals;
   discrimination means for discriminating if an audio call has been finished before a data communication by said data communication means is finished; and
   generation means for generating an audio signal associated with a finish of the audio call in accordance with a discrimination result of said discrimination means.

5. An apparatus according to claim 4, wherein the audio signal associated with the finish of the audio call is a line disconnection tone.

6. An apparatus according to claim 4, wherein said data communication means comprises means capable of time-divisionally transmitting or receiving said audio and data signals.

7. An apparatus according to claim 4, wherein said data communication means comprises means for modulating said audio and data signals with different carrier frequencies.

8. A communication apparatus comprising:
   data communication means capable of transmitting or receiving audio signals while substantially simultaneously transmitting or receiving data signals via a network;
   discrimination means for discriminating if a new audio call start instruction is generated after an audio call with a specific partner by said data communication means has been finished and before a communication of data is finished; and
   control means for performing predetermined network control in accordance with a discrimination result of said discrimination means.

9. An apparatus according to claim 8, wherein the predetermined network control includes an operation for breaking the communication of the data, and disconnecting the network with the specific partner.

10. An apparatus according to claim 8, wherein the predetermined network control includes an operation for holding the network with the specific partner until the communication of the data is finished, and informing a user that a new audio call is impossible to make.

11. An apparatus according to claim 8, wherein said data communication means comprises means capable of time-divisionally transmitting or receiving said audio and data signals.

12. An apparatus according to claim 8, wherein said data communication means comprises means for modulating said audio and data signals with different carrier frequencies.

13. A communication apparatus comprising:

data communication means capable of transmitting or receiving audio signals while substantially simultaneously transmitting or receiving data signals;

discrimination means for discriminating whether or not a communication partner is a specific partner;

confirmation means for confirming a presence/absence of renewed data in said apparatus; and control means for controlling said data communication means to perform a data communication associated with the renewed data in accordance with a discrimination result of said discrimination means and a confirmation result of said confirmation means.

14. An apparatus according to claim 13, wherein said discrimination means comprises means for discriminating based on a telephone number of the communication partner if the communication partner is the specific partner.

15. An apparatus according to claim 13, wherein said data communication means comprises means capable of time-divisionally transmitting or receiving said audio and data signals.

16. An apparatus according to claim 13, wherein said data communication means comprises means for modulating said audio and data signals with different carrier frequencies.

17. A communication apparatus comprising:

storage means for storing data to be renewed;

timer means in which a predetermined time is set in accordance with a kind of the data upon renewal of the data; and means for generating information to a user or transmitting data stored in said storage means to a designated communication partner in accordance with a count of the predetermined time by said timer means.

18. An apparatus according to claim 17, further comprising:

renewal means for renewing said data.

19. A method of controlling a communication apparatus including data communication means capable of transmitting or receiving audio signals while substantially simultaneously transmitting or receiving data signals, said method comprising the steps of:

informing a data transmission or reception state by the data communication means to a user who is performing an audio call using the data communication means; and inhibiting the user from generating a new call while the data communication means is executing transmission or reception of data signals.

20. A method according to claim 19, wherein the data communication means comprises means capable of time-divisionally transmitting or receiving said audio and data signals.

21. An apparatus according to claim 19, wherein the data communication means comprises means for modulating said audio and data signals with different carrier frequencies.

22. A method of controlling a communication apparatus including data communication means capable of transmitting or receiving audio signals while substantially simultaneously transmitting or receiving data signals, said method comprising the steps of:

discriminating if an audio call has been finished before a data communication by the data communication means is finished; and generating an audio signal associated with a finish of the audio call in accordance with a discrimination result of said discrimination step.

23. A method according to claim 22, wherein the audio signal associated with the finish of the audio call is a line disconnection tone.

24. A method according to claim 22, wherein the data communication means comprises means capable of time-divisionally transmitting or receiving said audio and data signals.

25. A method according to claim 22, wherein the data communication means comprises means for modulating said audio and data signals with different carrier frequencies.

26. A method of controlling a communication apparatus including data communication means capable of transmitting or receiving audio signals while substantially simultaneously transmitting or receiving data signals via a network, said method comprising the steps of:

discriminating if a new audio call start instruction is generated after an audio call with a specific partner by the data communication means has been finished and before a communication of data is finished; and performing predetermined network control in accordance with a discrimination result of said discrimination step.

27. A method according to claim 26, wherein the predetermined network control includes an operation for breaking the communication of the data, and disconnecting the network with the specific partner.

28. A method according to claim 20, wherein the predetermined network control includes an operation for holding the network with the specific partner until the communication of the data is finished, and informing a user that a new audio call is impossible to make.

29. A method according to claim 26, wherein the data communication means comprises means capable of time-divisionally transmitting or receiving said audio and data signals.

30. An apparatus according to claim 26, wherein the data communication means comprises means for modulating said audio and data signals with different carrier frequencies.

31. A method of controlling a communication apparatus including data communication means capable of transmitting or receiving audio signals while substantially simultaneously transmitting or receiving data signals, said method comprising the steps of:

discriminating whether or not a communication partner is a specific partner;

confirming a presence/absence of renewed data in the communication apparatus; and controlling the data communication means to perform a data communication associated with the renewed data in accordance with a discrimination result of said discrimination step and a confirmation result of said confirmation step.

32. A method according to claim 31, wherein said discrimination step comprises discriminating based on a telephone number of the communication partner if the communication partner is the specific partner.

33. A method according to claim 31, wherein the data communication means comprises means capable of time-divisionally transmitting or receiving said audio and data signals.

34. A method according to claim 31, wherein the data communication means comprises means for modulating said audio and data signals with different carrier frequencies.

35. A communication method comprising:

storing data to be renewed;

setting a predetermined time in accordance with a kind of the data upon renewal of the data; and generating information to a user or transmitting the stored data to a designated communication partner in accordance with a count of the predetermined time.

36. A communication method according to claim 35, further comprising a renewal step for renewing the stored data.

* * * * *